(12) United States Patent (10) Patent No.: US 12,696,154 B2

Liu et al. (45) Date of Patent: Jul. 28, 2026

(54) CELL SELECTION OR RESELECTION METHOD, TERMINAL DEVICE, AND NETWORK DEVICE

(71) Applicant: Huawei Technologies Co., Ltd., Shenzhen (CN)

(72) Inventors: Nannan Liu, Beijing (CN); Jiaojiao Li, Beijing (CN); Junren Chang, Beijing (CN); Lingshuai Kong, Beijing (CN); Zhenzhen Cao, Boulogne Billancourt (FR)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 365 days.

(21) Appl. No.: 18/353,635

(22) Filed: Jul. 17, 2023

(65) Prior Publication Data

US 2023/0362769 A1 Nov. 9, 2023

Related U.S. Application Data

(63) Continuation of application No. PCT/CN2021/072351, filed on Jan. 17, 2021.

(51) Int. Cl.
H04W 36/08 (2009.01)
H04W 48/20 (2009.01)

(52) U.S. Cl.
CPC ........... H04W 36/08 (2013.01); H04W 48/20 (2013.01)

(58) Field of Classification Search
CPC .............................. H04W 36/08; H04W 48/20
See application file for complete search history.

(56) References Cited

U.S. PATENT DOCUMENTS

| | | | |
|---|---|---|---|
| 2020/0235877 A1 | 7/2020 | Manolakos et al. | |
| 2020/0280894 A1 | 9/2020 | Koskinen et al. | |
| 2020/0413450 A1* | 12/2020 | Kim ................. | H04W 74/0833 |

FOREIGN PATENT DOCUMENTS

| | | |
|---|---|---|
| JP | 2010273381 A | 12/2010 |
| JP | 2017108195 A | 6/2017 |

OTHER PUBLICATIONS

3rd Generation Partnership Project; Technical Specification Group Radio Access Network; Evolved Universal Terrestrial Radio Access (E-UTRA); Radio Resource Control (RRC); Protocol specification (Release 16). 3GPP TS 36.331 V16.2.1 (Sep. 2020), total 1081 pages.

3rd Generation Partnership Project; Technical Specification Group Radio Access Network; NR; User Equipment (UE) procedures in Idle mode and RRC Inactive state (Release 16). 3GPP TS 38.304 V16.2.0 (Sep. 2020), total 39 pages.

R2-1803059, Ericsson, TP to 38.331 on System Information, 3GPP TSG-RAN WG2 #101 Athens, Greece, Feb. 26-Mar. 2, 2018. total 4 pages.

(Continued)

*Primary Examiner* — Justin Y Lee

(74) *Attorney, Agent, or Firm* — Conley Rose, P.C.

(57) ABSTRACT

A cell selection or reselection method includes that a terminal device obtains first information that corresponds to a first cell and that is not specific to a frequency band or a frequency. When a first condition that corresponds to the first information and that is used to determine whether the terminal device can access the first cell is not met, the terminal device is allowed to select or reselect a cell on a same frequency as the first cell.

20 Claims, 6 Drawing Sheets

(56)         References Cited

OTHER PUBLICATIONS

R2-1817132, Ericsson, Correction for support of initial downlink BWP, 3GPP TSG-RAN2 Meeting #104, Spokane, USA, Nov. 12-16, 2018, total 2 pages.
R1-2006542, Swift Navigation, Proposed table of contents—Section 9 (possitioning integrity)—TR 38.857, 3GPP TSG RAN WG1 #111-e, Webinar, Aug. 17-28, 2020, total 3 pages.
R2-2009009, Fujitsu, Access restriction of RedCap UE, 3GPP TSG RAN WG2 #112-e, 3GPP, Nov. 2-13, 2020, total 3 pages.
R2-2100155 (Update of R2-2009105, OPPO, Discussion on RedCap UEs access control, 3GPP TSG RAN WG2 #113-e, Electronic, Jan. 25-Feb. 5, 2021, total 3 pages.
R2-2101256, Huawei et al, Identification and access restriction for RedCap UE, 3GPP TSG RAN WG2 #113-e, Electronic, Jan. 25-Feb. 5, 2021, total 6 pages.
R2-2101732, Ericsson, p-Max for FR2 in dedicated signaling, 3GPP TSG RAN WG2 #113-e, eMeeting, Jan. 25-Feb. 5, 2021, total 5 pages.
3GPP TS 38.331 V16.3.1, "3rd Generation Partnership Project;Technical Specification Group Radio Access Network; NR;Radio Resource Control (RRC) protocol specification,(Release 16)," Jan. 7, 2021, XP051967674, 932 pages.

* cited by examiner

100

110

120

130

140

150

TO

TO

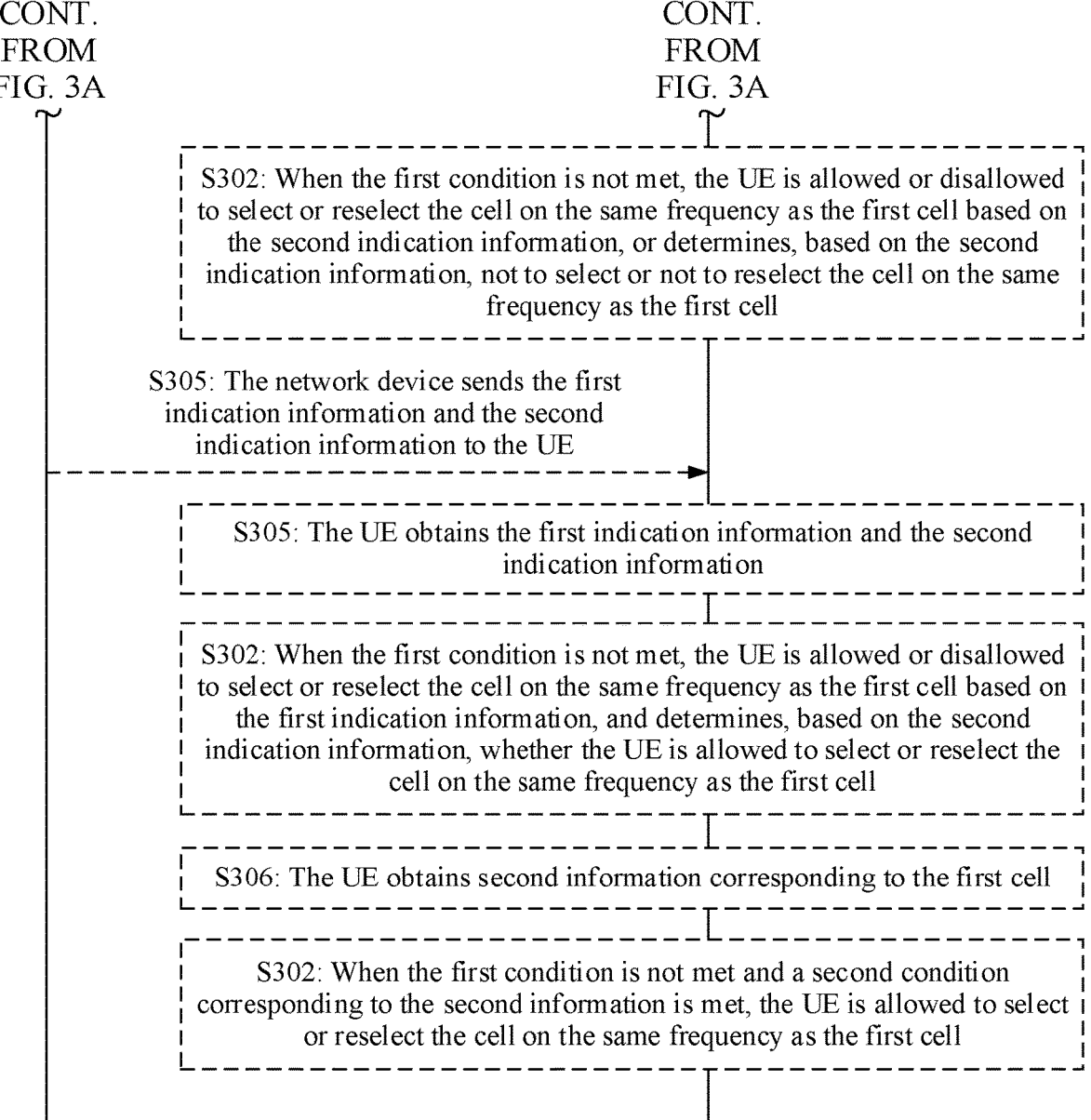

CONT.
FROM
FIG. 3A

CONT.
FROM
FIG. 3A

S302: When the first condition is not met, the UE is allowed or disallowed to select or reselect the cell on the same frequency as the first cell based on the second indication information, or determines, based on the second indication information, not to select or not to reselect the cell on the same frequency as the first cell S305: The network device sends the first indication information and the second indication information to the UE S305: The UE obtains the first indication information and the second indication information S302: When the first condition is not met, the UE is allowed or disallowed to select or reselect the cell on the same frequency as the first cell based on the first indication information, and determines, based on the second indication information, whether the UE is allowed to select or reselect the cell on the same frequency as the first cell S306: The UE obtains second information corresponding to the first cell S302: When the first condition is not met and a second condition corresponding to the second information is met, the UE is allowed to select or reselect the cell on the same frequency as the first cell

FIG. 3B

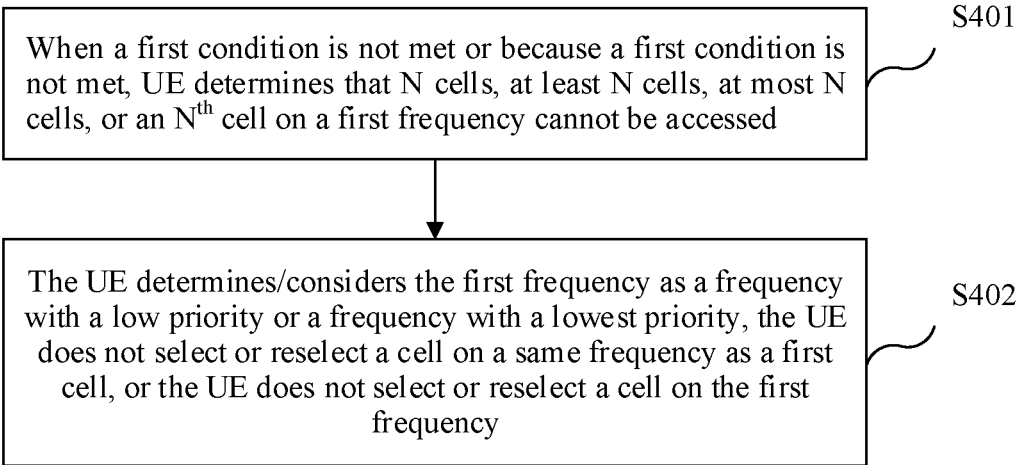

When a first condition is not met or because a first condition is not met, UE determines that N cells, at least N cells, at most N cells, or an $N^{th}$ cell on a first frequency cannot be accessed

S401

The UE determines/considers the first frequency as a frequency with a low priority or a frequency with a lowest priority, the UE does not select or reselect a cell on a same frequency as a first cell, or the UE does not select or reselect a cell on the first frequency

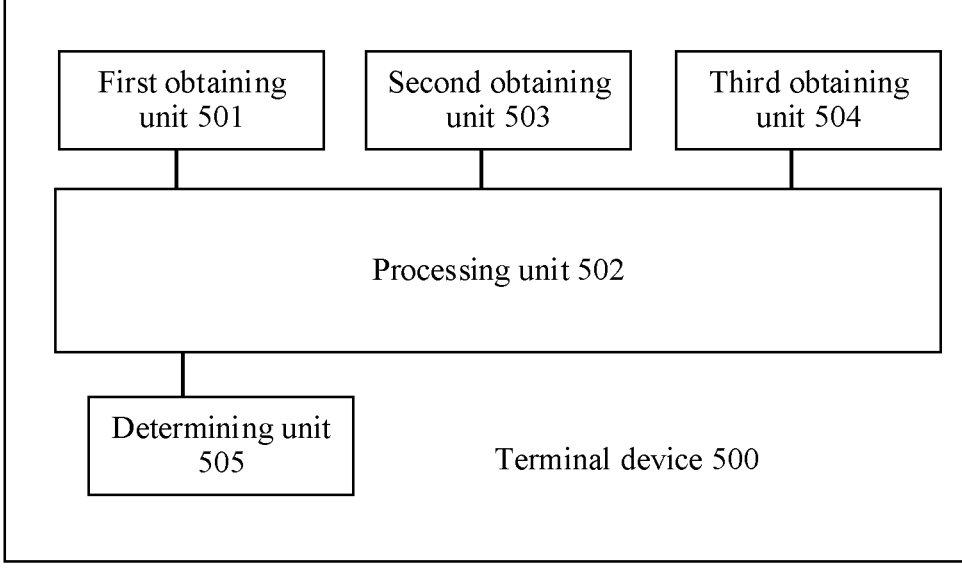

First obtaining unit 501

Second obtaining unit 503

Third obtaining unit 504

Processing unit 502

Determining unit 505

Terminal device 500

FIG. 5

CELL SELECTION OR RESELECTION METHOD, TERMINAL DEVICE, AND NETWORK DEVICE

CROSS-REFERENCE TO RELATED APPLICATIONS

This is a continuation of International Patent Application No. PCT/CN2021/072351 filed on Jan. 17, 2021, the disclosure of which is hereby incorporated by reference in its entirety.

TECHNICAL FIELD

Embodiments of the present disclosure relate to the field of communication technologies, and in particular, to a cell selection or reselection method, a terminal device, and a network device.

BACKGROUND

In new radio (NR) communications, for a cell on which a terminal device intends to camp, after obtaining a master information block (MIB) and a system information block (SIB), the terminal device may determine, based on the MIB and the SIB, whether the terminal device can access the cell. However, in some existing cases, when the terminal device cannot access the cell, the terminal device cannot access an intra-frequency cell. Consequently, cell access performance of the terminal device is affected.

SUMMARY

Embodiments of this description provide a cell selection or reselection method, a terminal device, and a network device, to prevent the terminal device from missing a cell on a same frequency as a first cell, thereby improving cell access performance of the terminal device.

To achieve the foregoing objectives, the following technical solutions are used in embodiments of this description.

According to a first aspect, an embodiment of this description provides a cell selection or reselection method. The method may be performed by a terminal device, or may be performed by a component (for example, a chip, a chip system, or a processor) in a terminal device. An example in which the method is performed by the terminal device is used below for description. The method includes that the terminal device obtains first information corresponding to a first cell, where the first information is not specific to a frequency band or a frequency. The terminal device selects or reselects a cell on the same frequency as the first cell when a first condition corresponding to the first information is not met, where the first condition is used to determine whether the terminal device can access the first cell.

In this embodiment of this description, when the first condition corresponding to the first information is not met, the terminal device is still allowed to select or reselect the cell on the same frequency as the first cell. This avoids/reduces (a probability/degree) that the terminal device misses the cell (for example, another cell, a suitable cell, or a cell that can be accessed/camped on) on a same frequency (for example, the same frequency as the first cell), thereby improving cell access performance of the terminal device. For example, a cell selection/reselection process can be accelerated. For example, an initial access process can be accelerated. For example, power consumption of the terminal device can be reduced.

In a possible implementation, the first information indicates any one or more of information about an initial downlink bandwidth part (BWP), information about an initial uplink BWP, and a carrier bandwidth. That the terminal device selects or reselects a cell on the same frequency as the first cell when a first condition corresponding to the first information is not met comprises when a channel bandwidth supported by the terminal device does not meet the first condition, the terminal device selects or reselects the cell on the same frequency as the first cell.

In a possible implementation, the first condition includes any one or more of the channel bandwidth supported by the terminal device is wider than or equal to a bandwidth of the initial downlink BWP, and is smaller than or equal to the carrier bandwidth; and the channel bandwidth supported by the terminal device is wider than or equal to a bandwidth of the initial uplink BWP, and is smaller than or equal to the carrier bandwidth.

In a possible implementation, the cell selection or reselection method provided in this embodiment of this description further includes that the terminal device obtains first indication information and/or second indication information. The first indication information indicates that the terminal device is allowed to select or reselect the cell on the same frequency as the first cell when the first cell is barred or is considered as barred by the terminal device. The second indication information indicates that the terminal device is allowed to select or reselect the cell on the same frequency as the first cell when the first cell is barred because the first condition is not met, or indicates that first information corresponding to the cell on the same frequency as the first cell is different from the first information corresponding to the first cell. That the terminal device selects or reselects a cell on the same frequency as the first cell comprises that the terminal device determines, based on the first indication information and/or the second indication information, to select or reselect the cell on the same frequency as the first cell.

In this embodiment, when the first condition corresponding to the first information is not met, the terminal device determines, based on indication content of the first indication information and/or indication content of the second indication information, that selection or reselection of the cell on the same frequency as the first cell is allowed. In this way, the terminal device may still select or reselect the cell on the same frequency as the first cell, thereby improving the cell access performance of the terminal device. For example, the cell selection/reselection process can be accelerated. For example, the initial access process can be accelerated. For example, the power consumption of the terminal device can be reduced.

In a possible implementation, the first indication information indicates that the terminal device is disallowed to select or reselect the cell on the same frequency as the first cell when the first cell is barred or is considered as barred by the terminal device. The second indication information indicates that the terminal device is disallowed to select or reselect the cell on the same frequency as the first cell when the first cell is barred because the first condition is not met, or indicates that the first information corresponding to the cell on the same frequency as the first cell is the same as the first information corresponding to the first cell. The cell selection or reselection method provided in this embodiment further includes that when the first condition is not met, the terminal device determines, based on the first indication information and/or the second indication information, not to select or not to reselect the cell on the same frequency as the first cell.

In this embodiment, when the first condition corresponding to the first information is not met, the terminal device determines, based on the indication content of the first indication information and/or the indication content of the second indication information, that selection or reselection of the cell on the same frequency as the first cell is disallowed. The second indication information is related to whether the terminal device meets the first condition. In this way, the terminal device cannot select or cannot reselect the cell on the same frequency as the first cell.

In a possible implementation, the cell selection or reselection method provided in this embodiment further includes that the terminal device obtains second information corresponding to the first cell, where the second information is specific to a frequency band or a frequency. That a first condition corresponding to the first information is not met comprises that the first condition is not met and a second condition corresponding to the second information is met, where the second condition is used to determine whether the terminal device can access the first cell.

In a possible implementation, the terminal device obtains the second information corresponding to the first cell, where the second information is specific to a frequency band or a frequency. That the terminal device is allowed to select or reselect the cell on the same frequency as the first cell when the first condition corresponding to the first information is not met comprises that the terminal device is allowed to select or reselect the cell on the same frequency as the first cell when the first condition is not met and the second condition corresponding to the second information is met. The second condition is used to determine whether the terminal device can access the first cell.

In this embodiment, because the second information is limited to the frequency band or the frequency, the second condition corresponding to the second information is also limited to the frequency band or the frequency. When the first condition is not met, and the second condition corresponding to the second information is met, it may be determined that the terminal device meets the second condition, in other words, that the terminal device cannot camp on the cell is not because a frequency band or frequency-related condition is not met. Therefore, the terminal device is allowed to select or reselect the cell on the same frequency as the first cell. This can prevent the terminal device from missing the cell on the same frequency as the first cell, thereby improving the cell access performance of the terminal device. For example, the cell selection/reselection process can be accelerated. For example, the initial access process can be accelerated. For example, the power consumption of the terminal device can be reduced.

In this embodiment, when the first condition corresponding to the first information is not met, and the second information corresponding to the second information is met, the terminal device determines, based on the indication content of the first indication information and/or the indication content of the second indication information, that selection or reselection of the cell on the same frequency as the first cell is allowed. In this way, the terminal device is allowed to select or reselect the cell on the same frequency as the first cell.

In a possible implementation, the second condition includes any one or more of the terminal device supports a frequency band corresponding to the first cell; the terminal device supports a transmission requirement of the frequency band corresponding to the first cell; and a network device indicates to disable NR uplink transmission with a 7.5 k frequency shift to an Long-Term Evolution (LTE) raster, or a network device indicates to enable NR uplink transmission with a 7.5 k frequency shift to an LTE raster and the terminal device supports the 7.5 kilohertz (kHz) frequency shift.

In a possible implementation, the cell selection or reselection method provided in this embodiment further includes that when the first condition is not met, the terminal device determines that N cells, at least N cells, at most N cells, or an Nth cell on a frequency of the first cell cannot be accessed, where N is a positive integer greater than or equal to 1. The terminal device determines that the frequency of the first cell has a lowest priority, and/or the terminal device skips selecting, or skips reselecting the cell on the same frequency as the first cell.

In this embodiment of this description, a quantity of cells that can be accessed by the terminal device is limited, so that the terminal device can be prevented from continuous attempts to access on the frequency point of the first cell, thereby improving cell access efficiency and performance of the terminal device.

In a possible implementation, that the terminal device selects or reselects a cell on the same frequency as the first cell comprises that the terminal device is allowed to select or reselect the cell on the same frequency as the first cell.

In a possible implementation, that the terminal device skips selecting or skips reselecting the cell on the same frequency as the first cell comprises that the terminal device is disallowed to select or reselect the cell on the same frequency as the first cell.

In a possible implementation, the first cell operates in an unlicensed spectrum and/or a licensed spectrum.

According to a second aspect, an embodiment of this description provides a cell selection or reselection method. The method may be performed by a network device, or may be performed by a component (for example, a chip, a chip system, or a processor) in a network device. An example in which the method is performed by the network device is used below for description. The method includes that the network device sends first indication information and/or second indication information to a terminal device, to indicate the terminal device to determine, based on the first indication information and/or the second indication information, to select or reselect a cell on a same frequency as a first cell when a first condition corresponding to first information is not met. The first information is not specific to a frequency band or a frequency, and the first condition is used to determine whether the terminal device can access the first cell. The first indication information indicates that the terminal device is allowed to select or reselect the cell on the same frequency as the first cell when the first cell is barred or is considered as barred by the terminal device. The second indication information indicates that the terminal device is allowed to select or reselect the cell on the same frequency as the first cell when the first cell is barred because the first condition is not met, or indicates that first information corresponding to the cell on the same frequency as the first cell is different from the first information corresponding to the first cell.

In this embodiment, when the first condition corresponding to the first information is not met, the terminal device determines, based on indication content of the first indication information and/or indication content of the second indication information, that selection or reselection of the cell on the same frequency as the first cell is allowed. In this way, the terminal device may still select or reselect the cell on the same frequency as the first cell, thereby improving cell access performance of the terminal device. For example, a cell selection/reselection process can be accelerated. For example, an initial access process can be accelerated. For example, power consumption of the terminal device can be reduced.

In a possible implementation, the first indication information indicates that the terminal device is disallowed to select or reselect the cell on the same frequency as the first cell when the first cell is barred or is considered as barred by the terminal device. The second indication information indicates that the terminal device is disallowed to select or reselect the cell on the same frequency as the first cell when the first cell is barred because the first condition is not met, or indicates that the first information corresponding to the cell on the same frequency as the first cell is the same as the first information corresponding to the first cell. The network device is further configured to when the first condition corresponding to the first information is not met, indicate the terminal device to determine, based on the first indication information and/or the second indication information, not to select or not to reselect the cell on the same frequency as the first cell.

In this embodiment, when the first condition corresponding to the first information is not met, the terminal device determines, based on the indication content of the first indication information and/or the indication content of the second indication information, that selection or reselection of the cell on the same frequency as the first cell is disallowed. The second indication information is related to whether the terminal device meets the first condition. In this way, the terminal device cannot select or cannot reselect the cell on the same frequency as the first cell.

According to a third aspect, an embodiment of this description provides a terminal device. The terminal device includes a first obtaining unit, configured to obtain first information corresponding to a first cell, where the first information is not specific to a frequency band or a frequency; and a processing unit, configured to select or reselect a cell on the same frequency as the first cell when a first condition corresponding to the first information is not met, where the first condition is used to determine whether the terminal device can access the first cell.

In this embodiment, when the first condition corresponding to the first information is not met, the terminal device is still allowed to select or reselect the cell on the same frequency as the first cell. This avoids/reduces (a probability/degree) that the terminal device misses the cell (for example, another cell, a suitable cell, or a cell that can be accessed/camped on) on a same frequency (for example, the same frequency as the first cell), thereby improving cell access performance of the terminal device. For example, a cell selection/reselection process can be accelerated. For example, an initial access process can be accelerated. For example, power consumption of the terminal device can be reduced.

In a possible implementation, the first information indicates any one or more of information about an initial downlink BWP, information about an initial uplink BWP, and a carrier bandwidth.

In a possible implementation, the first condition includes any one or more of a channel bandwidth supported by the terminal device is wider than or equal to a bandwidth of the initial downlink BWP, and is smaller than or equal to the carrier bandwidth; and the channel bandwidth supported by the terminal device is wider than or equal to a bandwidth of the initial uplink BWP, and is smaller than or equal to the carrier bandwidth.

In a possible implementation, the terminal device further includes a second obtaining unit, configured to obtain first indication information and/or second indication information. The first indication information indicates that the terminal device is allowed to select or reselect the cell on the same frequency as the first cell when the first cell is barred or is considered as barred by the terminal device. The second indication information indicates that the terminal device is allowed to select or reselect the cell on the same frequency as the first cell when the first cell is barred because the first condition is not met, or indicates that first information corresponding to the cell on the same frequency as the first cell is different from the first information corresponding to the first cell. The processing unit is further configured to determine, based on the first indication information and/or the second indication information, to select or reselect the cell on the same frequency as the first cell.

In a possible implementation, the first indication information indicates that the terminal device is disallowed to select or reselect the cell on the same frequency as the first cell when the first cell is barred or is considered as barred by the terminal device. The second indication information indicates that the terminal device is disallowed to select or reselect the cell on the same frequency as the first cell when the first cell is barred because the first condition is not met, or indicates that the first information corresponding to the cell on the same frequency as the first cell is the same as the first information corresponding to the first cell. The processing unit is configured to when the first condition is not met, determine, based on the first indication information and/or the second indication information, not to select or not to reselect the cell on the same frequency as the first cell.

In a possible implementation, a third obtaining unit is configured to obtain second information corresponding to the first cell, where the second information is specific to a frequency band or a frequency. That a first condition corresponding to first information is not met comprises that the first condition is not met and a second condition corresponding to the second information is met, where the second condition is used to determine whether the terminal device can access the first cell.

In this embodiment, (the probability/degree) that the terminal device misses the cell (for example, the another cell, the suitable cell, or the cell that can be accessed/camped on) on the same frequency (for example, the same frequency as the first cell) is avoided/reduced, thereby improving the cell access performance of the terminal device. For example, the cell selection/reselection process can be accelerated. For example, the initial access process can be accelerated. For example, the power consumption of the terminal device can be reduced. For example, before selecting or reselecting the cell on the same frequency as the first cell, the terminal device determines that the second condition can be met (for example, it indicates that the terminal device cannot camp on the cell is not because a frequency band or frequency-related condition is not met). In addition, a meaningless attempt to access the intra-frequency cell when the second condition is not met is avoided.

In a possible implementation, the second condition includes any one or more of the terminal device supports a frequency band corresponding to the first cell; the terminal device supports a transmission requirement of the frequency band corresponding to the first cell; and a network device indicates to disable NR uplink transmission with a 7.5 k frequency shift to an LTE raster, or a network device indicates to enable NR uplink transmission with a 7.5 k frequency shift to an LTE raster and the terminal device supports the 7.5 kHz frequency shift.

In a possible implementation, the terminal device further includes a determining unit, configured to when the first condition is not met, determine that N cells, at least N cells, at most N cells, or an Nth cell on a frequency of the first cell cannot be accessed, where N is a positive integer greater than or equal to 1. The processing unit is configured to determine that the frequency of the first cell has a lowest priority, and/or not to select or not to reselect the cell on the same frequency as the first cell.

In a possible implementation, the processing unit is configured to allow selection or reselection of the cell on the same frequency as the first cell.

In a possible implementation, the processing unit is configured to disallow selection or reselection of the cell on the same frequency as the first cell.

In a possible implementation, the first cell operates in an unlicensed spectrum and/or a licensed spectrum.

According to a fourth aspect, an embodiment of this description provides a network device. The network device is configured to send first indication information and/or second indication information to a terminal device; and when a first condition corresponding to first information is not met, indicate the terminal device to determine, based on the first indication information and/or the second indication information, to select or reselect a cell on a same frequency as a first cell. The first information is not specific to a frequency band or a frequency, and the first condition is used to determine whether the terminal device can access the first cell. The first indication information indicates that the terminal device is allowed to select or reselect the cell on the same frequency as the first cell when the first cell is barred or is considered as barred by the terminal device. The second indication information indicates that the terminal device is allowed to select or reselect the cell on the same frequency as the first cell when the first cell is barred because the first condition is not met, or indicates that first information corresponding to the cell on the same frequency as the first cell is different from the first information corresponding to the first cell.

In a possible implementation, the first indication information indicates that the terminal device is disallowed to select or reselect the cell on the same frequency as the first cell when the first cell is barred or is considered as barred by the terminal device. The second indication information indicates that the terminal device is disallowed to select or reselect the cell on the same frequency as the first cell when the first cell is barred because the first condition is not met, or indicates that the first information corresponding to the cell on the same frequency as the first cell is the same as the first information corresponding to the first cell. The network device is further configured to when the first condition corresponding to the first information is not met, indicate the terminal device to determine, based on the first indication information and/or the second indication information, not to select or not to reselect the cell on the same frequency as the first cell.

According to a fifth aspect, this description provides a communication apparatus, including a processor, a storage medium, at least one processor, and an interface circuit. The interface circuit is configured to receive a signal from another communication apparatus other than the communication apparatus and transmit the signal to the processor or send a signal from the processor to another communication apparatus other than the communication apparatus. The processor is configured to implement, by using a logic circuit or executing code instructions, the method described in any one of the first aspect and the second aspect and the possible implementations of the first aspect and the second aspect. The communication apparatus may be a network device or a terminal device, or may be a chip in a network device or a chip in a terminal device.

According to a sixth aspect, this description provides a communication system, including a terminal device and a network device. The terminal device is configured to perform the method described in the possible implementations of the first aspect, and the network device is configured to perform the method described in the possible implementations of the second aspect.

According to a seventh aspect, an embodiment of this description provides a computer-readable storage medium. The computer-readable storage medium includes computer instructions. When the computer instructions are run on an electronic device, the electronic device is enabled to perform the cell selection or reselection method described in any one of the first aspect and the second aspect and the possible implementations of the first aspect and the second aspect.

According to an eighth aspect, an embodiment of this description provides a computer program. When the program is invoked by a processor, the computer program performs the cell selection or reselection method described in any one of the first aspect and the second aspect, and the possible implementations of the first aspect and the second aspect.

According to a ninth aspect, an embodiment of this description provides a chip system, including one or more processors. When the one or more processors execute instructions, the one or more processors perform the cell selection or reselection method described in any one of the first aspect and the second aspect and the possible implementations of the first aspect and the second aspect.

It should be understood that, descriptions of technical features, technical solutions, beneficial effect, or similar words in this description do not imply that all features and advantages can be implemented in any individual embodiment. It may be understood that, the descriptions of the features or the beneficial effect mean that at least one embodiment includes a specific technical feature, technical solution, or beneficial effect. Therefore, the descriptions of the technical features, the technical solutions, or the beneficial effect in this specification may not necessarily be specific to a same embodiment. Further, the technical features, the technical solutions, and the beneficial effect described in embodiments may further be combined in any proper manner. A person skilled in the art may understand that an embodiment may be implemented without one or more specific technical features or technical solutions, or beneficial effect in a specific embodiment. In other embodiments, additional technical features and beneficial effect may further be identified in a specific embodiment that does not reflect all embodiments.

BRIEF DESCRIPTION OF DRAWINGS

To explain technical solutions in embodiments of this description more clearly, the following briefly describes accompanying drawings used for describing embodiments. It is clear that the accompanying drawings in the following descriptions show merely some embodiments, and a person of ordinary skill in the art may further derive other accompanying drawings from these accompanying drawings without creative efforts.

FIG. 4 is a schematic flowchart of still another cell selection or reselection method according to an embodiment;

FIG. 5 is a schematic diagram of a structure of still another terminal device according to an embodiment.

DESCRIPTION OF EMBODIMENTS

In descriptions of this disclosure, unless otherwise specified, "/" means "or". For example, A/B may indicate A or B. A term "and/or" in this specification describes only an association relationship between associated objects and indicates that there may be three relationships. For example, A and/or B may indicate the following three cases: Only A exists, both A and B exist, and only B exists. In addition, "at least one" means one or more, and "a plurality of" means two or more. Terms such as "first" and "second" do not limit a quantity and an execution sequence, and the terms such as "first" and "second" do not indicate a definite difference.

A term such as "example" or "for example" is used for representing an example, an example illustration, or a description below. Any embodiment or design scheme described as an "example" or "for example" in embodiments of this description should not be explained as having more advantages than another embodiment or design scheme. The use of the word "example", "for example", or the like is intended to present a relative concept in a specific manner.

Figure 1:
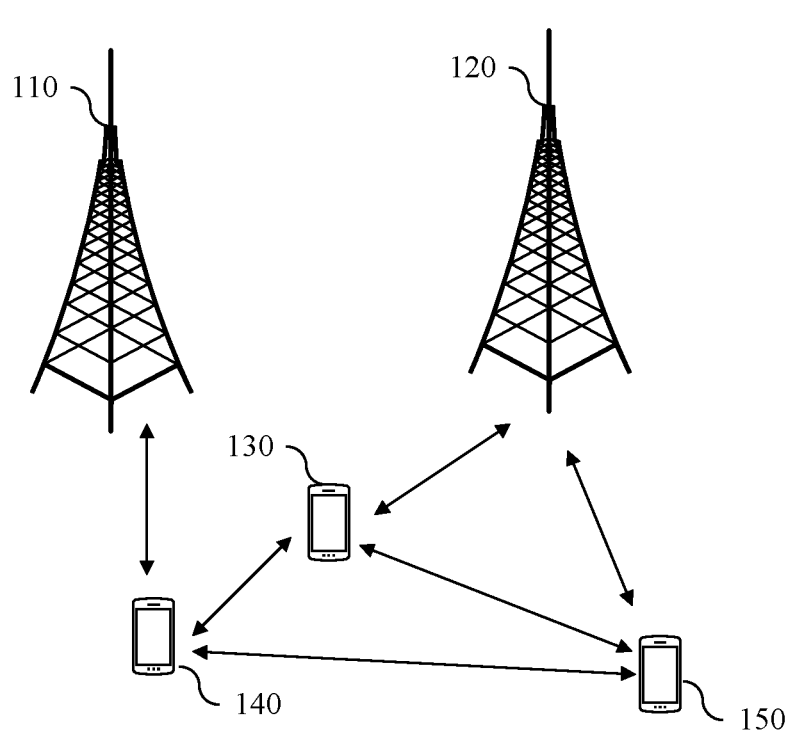
FIG. 1 is a schematic diagram of an architecture of a mobile communication system to which an embodiment is applied.

An embodiment of this description provides a cell selection or reselection method. The method is applied to a mobile communication system. FIG. 1 is a schematic diagram of an architecture of the mobile communication system to which an embodiment is applied. As shown in FIG. 1, a mobile communication system 100 includes at least one network device (for example, a network device 110 and a network device 120 in FIG. 1) and at least one terminal device (for example, a terminal device 130, a terminal device 140, and a terminal device 150 in FIG. 1). The terminal device is connected to the network device in a wireless manner. The terminal device may be located at a fixed position, or may be mobile. FIG. 1 is only a schematic diagram. The mobile communication system may further include another network device, for example, a wireless relay device and a wireless backhaul device, which are not drawn in FIG. 1. A quantity of network devices and a quantity of terminal devices included in the mobile communication system 100 are not limited in this embodiment.

Technical solutions in embodiments of this description may be applied to various communication systems, for example, and LTE system, an LTE frequency-division duplex (FDD) system, an LTE time-division duplex (TDD), a fifth generation (5G) system or NR system, and a future mobile communication system.

The method provided in embodiments of this description is applicable to but is not limited to the fields of multicast and broadcast services (MBS), vehicle-to-everything (V2X), public safety, mission-critical tasks, transparent Internet Protocol version 4 (IPv4)/Internet Protocol version 6 (IPv6) multicast delivery, Internet Protocol television (IPTV), software delivery over wireless, group communication, internet of things (IoT), television video (TV Video), television (TV), linear TV, live, radio services, and the like.

The terminal device in this description is an entity that is on a user side and that is configured to receive a signal, send a signal, or receive a signal and send a signal. The terminal device is configured to provide one or more of a voice service and a data connectivity service for a user. The terminal device may also be referred to as user equipment (UE), a mobile station (MS), a mobile terminal (MT), an access terminal, a subscriber unit, a subscriber station, a mobile station, a remote station, a remote terminal, a mobile device, a user terminal, a wireless communication device, a user agent, or a user apparatus. The terminal device may be a V2X device, for example, a smart car (or intelligent car), a digital car, an unmanned car (driverless car, pilotless car, or automobile), a self-driving car (or autonomous car), a pure electric vehicle (pure EV or Battery EV), a hybrid electric vehicle (HEV), a range extended electric vehicle (range extended EV, REEV), a plug-in hybrid electric vehicle (plug-in HEV, PHEV), or a new energy vehicle. Alternatively, the terminal device may be a device-to-device (D2D) device, for example, an electricity meter or a water meter. Alternatively, the terminal device may be a MS, a subscriber unit, an unmanned aerial vehicle, an IoT device, a station (ST) in a wireless local area network (WLAN), a cellular phone, a smartphone, a cordless phone, a wireless data card, a tablet computer, a session initiation protocol (SIP) phone, a wireless local loop (WLL) station, a personal digital assistant (PDA) device, a laptop computer, a machine type communication (MTC) terminal, a handheld device with a wireless communication function, a computing device or another processing device connected to a wireless modem, a vehicle-mounted device, a wearable device (which may also be referred to as a wearable intelligent device), a low-cost device, a low-power device, or a camera. Alternatively, the terminal device may be a terminal device in a next generation communication system, for example, a terminal device in the 5G system, a terminal device in a future evolved public land mobile network (PLMN), or a terminal device in the NR system.

The network device in embodiments of this description may be a device that provides a wireless communication function for the terminal device, and may also be referred to as a radio access network (RAN) device or the like. The network device includes but is not limited to a next-generation NodeB (gNB) in 5G, an evolved NodeB (eNB), a baseband unit (BBU), a transmission reception point (TRP), a transmission point (TP), a relay station, an access point, and the like. Alternatively, the network device may be a radio controller, a central unit (CU), a distributed unit (DU), or the like in a cloud radio access network (CRAN) scenario. The network device may support at least one wireless communication technology, for example, LTE, NR, or wideband code division multiple access (WCDMA).

In some deployments, the gNB may include a central unit CU and a DU. The gNB may further include an active antenna unit (AAU). The CU performs some functions of the gNB, and the DU performs some functions of the gNB. For example, the CU is responsible for processing a non-real-time protocol and service, and implements functions of a radio resource control (RRC) layer and a packet data convergence protocol (PDCP) layer. The DU is responsible for processing a physical layer protocol and a real-time service, and implements functions of a radio link control (RLC) layer, a media access control (MAC) layer, and a physical layer (PHY) layer. The AAU implements some physical layer processing functions, radio frequency processing, and a function related to an active antenna. Information at the RRC layer eventually becomes information at the PHY layer, or is converted from information at the PHY layer. Therefore, in this architecture, higher-layer signaling such as RRC layer signaling may also be considered as being sent by the DU or sent by the DU and the AAU. It may be understood that the network device may be a device including one or more of a CU node, a DU node, and an AAU node. In addition, the CU may be classified into a network device in a RAN, or the CU may be classified into a network device in a core network (CN). This is not limited in this description.

In embodiments of this description, the terminal or the network device includes a hardware layer, an operating system layer running above the hardware layer, and an application layer running above the operating system layer. The hardware layer includes hardware such as a central processing unit (CPU), a memory management unit (MMU), and a memory (also referred to as a main memory). The operating system may be any one or more types of computer operating systems that implement service processing through a process, for example, a Linux operating system, a Unix operating system, an Android operating system, an iOS operating system, or a Windows operating system. The application layer includes applications such as a browser, an address book, word processing software, and instant messaging software. In addition, a specific structure of an execution body of the method provided in embodiments of this description is not limited in embodiments, provided that a program that records code of the method provided in embodiments of this description can be run to perform communication according to the method provided in embodiments. For example, the execution body of the method provided in embodiments of this application may be the terminal or the network device, or may be a functional module that is in the terminal or the network device and that can invoke the program and execute the program.

In addition, aspects or features of this description may be implemented as a method, an apparatus, or a product that uses standard programming and/or engineering technologies. For example, a computer-readable medium may include but is not limited to a magnetic storage component (for example, a hard disk, a floppy disk, or a magnetic tape), an optical disc (for example, a compact disc (CD) or a digital versatile disc (DVD), and a smart card and a flash memory component (for example, an erasable programmable read-only memory (EPROM), a card, a stick, or a key drive). In addition, various storage media described in this specification may represent one or more devices and/or other machine-readable media that are configured to store information. The term "machine-readable media" may include but is not limited to a radio channel, and various other media that can store, contain and/or carry instructions and/or data.

The network device may be an access device that the terminal device accesses the mobile communication system 100 in the wireless manner, or may be a NodeB, an evolved NodeB (eNodeB), a base station in an NR mobile communication system 100, a base station in a future mobile communication system 100, an access node in a Wi-Fi system, or the like. A specific technology and a specific device form used by the network device are not limited in embodiments of this description.

The network device and the terminal device may be deployed on the land, including an indoor device, an outdoor device, a handheld device, or a vehicle-mounted device; may be deployed on the water surface; or may be deployed on a plane, a balloon, and a satellite in the air. An application scenario of the network device and the terminal device is not limited in embodiments of this description.

Embodiments of this description may be applicable to downlink signal transmission, and may also be applicable to uplink signal transmission. For the downlink signal transmission, a sending device is the network device, and a corresponding receiving device is the terminal device. For the uplink signal transmission, a sending device is the terminal device, and a corresponding receiving device is the network device. A signal transmission direction is not limited in embodiment of this description.

The network device and the terminal device may communicate with each other by using a licensed spectrum, may communicate with each other by using an unlicensed spectrum, or may communicate with each other by using both a licensed spectrum and an unlicensed spectrum. The network device and the terminal device may communicate with each other by using a spectrum below 6 GHz, may communicate with each other by using a spectrum above 6 GHz, or may communicate with each other by using both a spectrum below 6 GHz and a spectrum above 6 GHz. A spectrum resource used between the network device and the terminal device is not limited in embodiments of this description.

Figure 2:
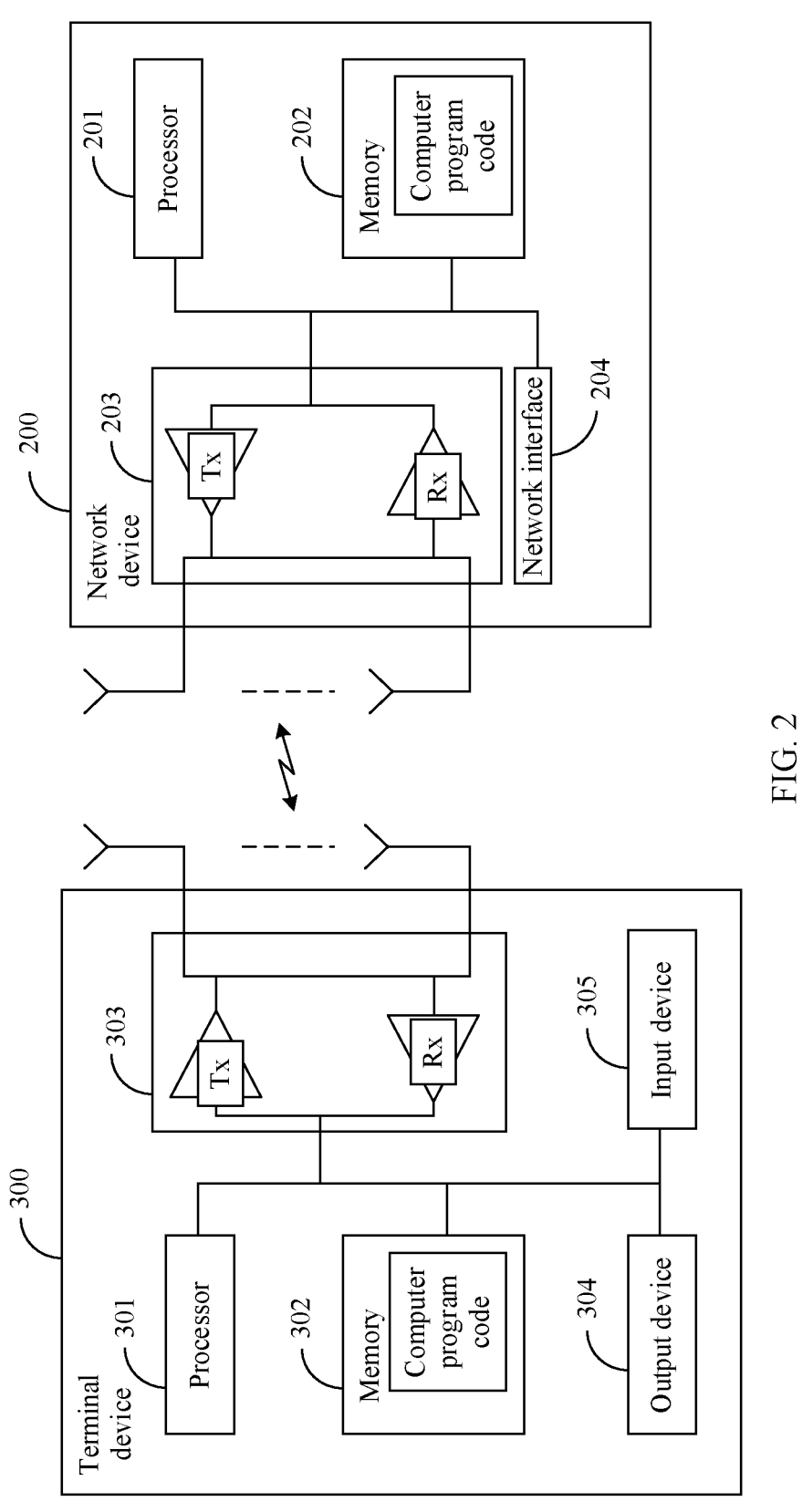
FIG. 2 is a schematic diagram of hardware structures of a network device and a terminal device in a mobile communication system 100 according to an embodiment.

FIG. 2 is a schematic diagram of hardware structures of the network device and the terminal device in the mobile communication system 100 according to an embodiment of this description. As shown in FIG. 2, a terminal device 300 (for example, the terminal device 130, the terminal device 140, and the terminal device 150 in FIG. 1) include at least one processor 301, at least one memory 302, and at least one transceiver 303. Optionally, the terminal device 300 may further include an output device 304 and an input device 305.

The processor 301, the memory 302, and the transceiver 303 are connected through a bus. The processor 301 may be a general-purpose CPU, a microprocessor, an application-specific integrated circuit (ASIC), or one or more integrated circuits configured to control program execution in the solutions of this description. The processor 301 may alternatively include a plurality of CPUs, and the processor 301 may be a single-core (single-CPU) processor or a multi-core (multi-CPU) processor. The processor herein may be one or more devices, circuits, or processing cores configured to process data (for example, computer program instructions).

The memory 302 may be a read-only memory (ROM) or another type of static storage device that can store static information and instructions, or a random-access memory (RAM) or another type of dynamic storage device that can store information and instructions; or may be an electrically erasable programmable read-only memory (EEPROM), a compact disc read-only memory (CD-ROM) or another compact disc storage, an optical disc storage (including a compact disc, a laser disc, an optical disc, a digital versatile disc, a BLU-RAY disc, or the like), a disk storage medium or another disk storage device, or any other medium that can be used to carry or store expected program code in an instruction or data structure form and that can be accessed by a computer. However, the memory 302 is not limited thereto. The memory 302 may exist independently, and is connected to the processor 301 through a bus. Alternatively, the memory 302 and the processor 301 may be integrated together. The memory 302 is configured to store application program code for executing the solutions of this description, and the processor 301 controls execution. The processor 301 is configured to execute the computer program code stored in the memory 302, to implement the cell selection or reselection method in embodiments of this description.

The transceiver 303 may use any type of apparatus such as a transceiver, and is configured to communicate with another device or a communication network such as the Ethernet, a radio access network (RAN), or a wireless local area network (WLAN). The transceiver 303 includes a transmitter Tx and a receiver Rx.

The output device 304 communicates with the processor 301, and may display information in a plurality of manners. For example, the output device 304 may be a liquid-crystal display (LCD), a light-emitting diode (LED) display device, a cathode-ray tube (CRT) display device, or a projector. The input device 305 communicates with the processor 301, and may receive a user input in a plurality of manners. For example, the input device 305 may be a mouse, a keyboard, a touchscreen device, or a sensor device.

A network device 200 (for example, the network device 110 and the network device 120 in FIG. 1) includes at least one processor 201, at least one memory 202, at least one transceiver 203, and at least one network interface 204. The processor 201, the memory 202, the transceiver 203, and the network interface 204 are connected through a bus. The network interface 204 is configured to connect to a core network device through a link (for example, an S1 interface), or connect to a network interface (not shown in the figure) of another network device through a wired or wireless link (for example, an X2 interface). This is not limited in this embodiment of this description. In addition, for related descriptions of the processor 201, the memory 202, and the transceiver 203, refer to descriptions of the processor 301, the memory 302, and the transceiver 303 in the terminal device 300. Details are not described herein again.

It should be noted that the solutions in embodiments of this description are described by using the terminal device (for example, UE) and the network device as examples, but are not limited to being applicable only to the terminal device and the network device, and may further be applicable to a communication apparatus that can support functions required for implementing the method.

To make this description clearer, some concepts in this description are first briefly described.

1. System Information (SI)

In NR, SI may include one MIB and several SIBs, for example, an SIB1, an SIB2, and an SIB3.

The MIB may include cellBarred information and basic physical layer information that is of a cell and that is required for further receiving the system information. For example, the MIB is periodically broadcast on a broadcast channel (BCH). The MIB may include the following two fields. For specific content, refer to 3GPP TS 38.331: "NR; Radio Resource Control (RRC); Protocol specification".

(1) CellBarred field. A value of the cellBarred field is "barred", which means that the cell is barred, for example, cellBarred ENUMERATED {barred, not-Barred}.

(2) IntraFreqReselection field, which is used to control selection/reselection of an intra-frequency cell when the cell or a highest ranked cell is barred or barred by UE. For example, when a value of the intraFreqRese-lection field is allowed and the cell is barred or considered as barred by the UE, the UE is allowed to select or reselect the cell on the same frequency as the cell, for example, intraFreqReselection ENUMERATED {allowed, notAllowed}.

The SIB1 may include scheduling information of other system information blocks and information required for initial access. For example, the SIB1 is periodically broadcast on a downlink shared channel (DL-SCH), or sent to connected UE on a DL-SCH in a dedicated signaling manner.

2. Cell Camping Determining in the NR

In the NR, after idle UE, inactive UE, or connected UE on which T311 is running receives an SIB1 of a first cell, the UE needs to determine whether to camp on the first cell. If a camping condition is not met, the UE cannot camp on the cell. The camping condition may include at least one of the following:

(1) whether the UE supports a frequency band corresponding to the first cell;

(2) whether the UE supports a transmission requirement of the frequency band corresponding to the first cell; and (3) whether a channel bandwidth supported by the UE meets a condition related to a BWP.

The camping condition (3) may include the following:

the channel bandwidth supported by the UE is wider than or equal to a bandwidth of an initial downlink BWP of the first cell, and is smaller than or equal to a carrier bandwidth of the first cell; and the channel bandwidth supported by the UE is wider than or equal to a bandwidth of an initial uplink BWP of the first cell, and is smaller than or equal to the carrier bandwidth of the first cell.

3. BWP

The BWP may also be referred to as the bandwidth part.

A subset of a total cell bandwidth of one cell is referred to as one BWP. In NR R15, a network device may configure a plurality of BWPs for a terminal device, but the terminal device can operate on only one BWP, namely, an active BWP or an initial BWP.

The foregoing briefly describes some concepts related to embodiments of this description.

In this description, a first condition corresponding to first information may be understood as the first condition related to the first information.

In this description, a second condition corresponding to second information may be understood as the second condition related to the second information.

In this description, a frequency may be understood as/re-placed with a frequency point.

In this description, obtaining may be understood as/re-placed with determining or receiving.

In this description, skipping selecting or reselecting may be understood as/replaced with not selecting or reselecting.

It should be noted that the BWP is used as an example for description in this specification, but a name of the BWP is not limited to the BWP. The BWP may alternatively have another name. For example, the BWP may be understood as a subset of a cell bandwidth or a frequency range. For example, the BWP may be understood as a part of the cell bandwidth or a part of a cell frequency. Alternatively, the cell bandwidth includes the BWP. For example, the BWP may alternatively be equal to the cell bandwidth.

In this description, disallowed may be understood as/re-placed with barred. For example, disallowing intra-fre-quency reselection may be understood as barring intra-frequency reselection.

In this description, that the cell is considered as barred may be understood as/replaced with that the cell is determined to be barred, or that UE determines that the cell is barred.

In this description, the frequency band may be understood as/replaced with a band.

In this description, considering may be understood as/replaced with determining, or determining as.

In the conventional technology, for a cell, when a camping condition is not met, the UE cannot camp on the cell, and the UE considers the cell as barred and considers intra-frequency reselection as barred. In conclusion, it can be learned that both the camping condition (1) and the camping condition (2) are frequency band or frequency-specific conditions. If the UE determines that the UE cannot camp on the cell because the camping condition (1) and the camping condition (2) are not met, it indicates that the UE cannot camp on a cell on a same frequency as the cell. Therefore, it is reasonable to bar intra-frequency reselection, and it also avoids a meaningless attempt of the UE on the intra-frequency cell. However, the camping condition (3) is not a frequency band or frequency-specific condition. If the UE determines that the UE cannot camp on the cell because the camping condition (3) is not met, it does not mean that the UE cannot camp on other cells on the frequency point. Therefore, it is unreasonable to directly bar intra-frequency reselection. Consequently, the UE may miss the cell on the same frequency as the cell, which affects cell access performance of the UE. For example, it is assumed that the channel bandwidth supported by the UE is 100 MHz, 80 MHz, 40 MHz, or 20 MHz. Information about carrier bandwidths and initial BWPs (an initial downlink BWP is used as an example for description) of a cell 1 and a cell 2 on a same frequency point are different. Details are as follows:

Cell 1: A carrier bandwidth is 90 MHz, and a bandwidth of an initial downlink BWP is 90 MHz. A channel bandwidth of 100 M supported by the UE is wider than the carrier bandwidth of the cell, and channel bandwidths of 80 M, 40 M, and 20 M supported by the UE are smaller than the bandwidth of the initial downlink BWP of the cell. Therefore, the UE cannot camp on this cell.

Cell 2: A carrier bandwidth is 90 MHz, and a bandwidth of an initial downlink BWP is 40 MHz. Channel bandwidths of 80 M and 40 M supported by the UE are smaller than the carrier bandwidth of the cell and wider than or equal to the bandwidth of the initial downlink BWP of the cell. Therefore, the UE can camp on this cell.

Therefore, if the camping condition (3) is not met, the UE cannot camp on the cell 1. If intra-frequency reselection is barred directly, the UE misses the cell 2 on the same frequency (the cell 2 can be camped on).

To resolve the foregoing problem, an embodiment of this description provides a cell selection or reselection method. The method includes that a UE obtains first information that corresponds to a first cell and that is not specific to a frequency band or a frequency. When the UE does not meet a first condition corresponding to the first information and used to determine whether the UE can access the first cell, the UE selects or reselects a cell on a same frequency as the first cell. In this way, the UE may access the cell on the same frequency as the first cell, thereby improving cell access performance of the UE. For example, a cell selection/reselection process can be accelerated. For example, an initial access process can be accelerated. For example, power consumption of the UE can be reduced.

The method in the following embodiments may be implemented on a device having the foregoing hardware structure (for example, the terminal device 130, the terminal device 140, and the terminal device 150 in FIG. 1).

Figures 3A, 3B:
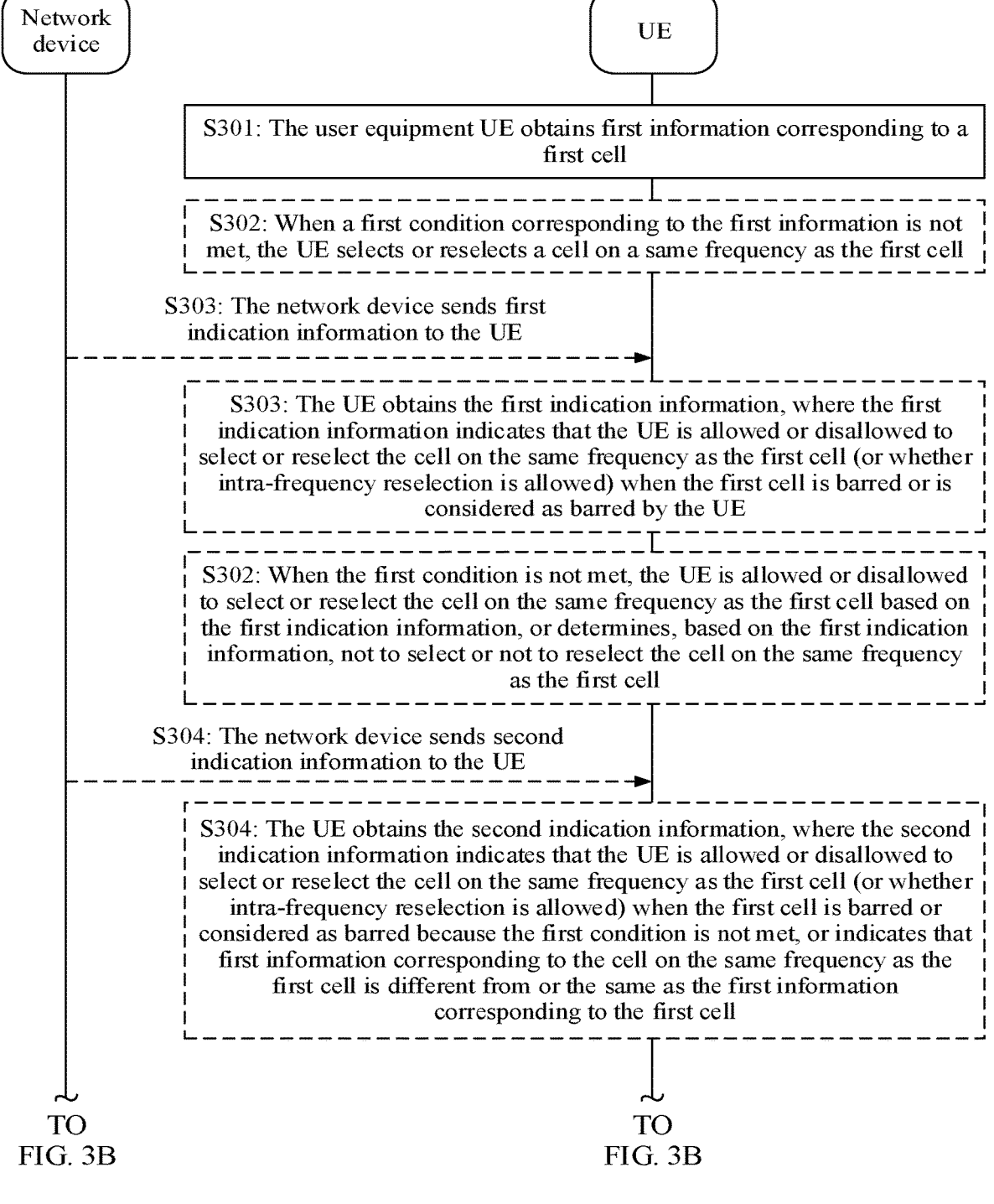
FIG. 3A and FIG. 3B are a schematic flowchart of a cell selection or reselection method according to an embodiment.

FIG. 3A and FIG. 3B are a schematic flowchart of a cell selection or reselection method according to an embodiment of this description. As shown in FIG. 3A and FIG. 3B, the method may include the following steps.

S301: User equipment UE obtains first information corresponding to a first cell.

For example, the first information is not specific to a frequency band or a frequency.

For example, the UE may include any one or more of idle UE, inactive UE, and connected UE on which T311 is running.

"The first information is not specific to a frequency band or a frequency" may be understood as the first information is not information that defines/is limited to the frequency band or the frequency, or understood as that the first information is not information about the frequency band or a frequency granularity.

For example, that the first information is not information that defines/is limited to the frequency band or the frequency may be understood as the first information is not information related to the frequency band or the frequency.

For example, that the first information is not information about the frequency band or a frequency granularity may be understood as first information corresponding to different cells on a same frequency band or frequency is not necessarily the same, is not necessarily exactly the same, or may be different.

For example, the first information may indicate any one or more of information about an initial downlink BWP corresponding to the first cell, information about an initial uplink BWP corresponding to the first cell, and a carrier bandwidth corresponding to the first cell.

The information about the initial downlink BWP may include any one or more of a bandwidth of the initial downlink BWP, a location of the initial downlink BWP, and a first subcarrier spacing (SCS) corresponding to the initial downlink BWP. The information about the initial downlink BWP may further include other content. This is not limited in this description.

For example, the location of the initial downlink BWP may include a frequency domain location of the initial downlink BWP.

For example, the frequency domain location of the initial downlink BWP may include any one or more a center frequency point of the initial downlink BWP, a start frequency point of the initial downlink BWP (for example, a lower/left boundary the initial downlink BWP), and a termination/end frequency point of the initial downlink BWP (for example, an upper/right boundary of the initial downlink BWP).

The information about the initial uplink BWP may include any one or more of the following: a bandwidth of the initial uplink BWP, a location of the initial uplink BWP, and a second SCS corresponding to the initial uplink BWP. The information about the initial uplink BWP may further include other content. This is not limited in this description.

For example, the location of the initial uplink BWP may include a frequency domain location of the initial uplink BWP.

For example, the frequency domain location of the initial uplink BWP may include any one or more a center frequency point of the initial uplink BWP, a start frequency point of the initial uplink BWP (for example, a lower/left boundary the initial uplink BWP), and a termination/end frequency point of the initial uplink BWP (for example, an upper/right boundary of the initial uplink BWP).

For example, the carrier bandwidth is a carrier bandwidth for the first SCS corresponding to the initial downlink BWP, or a carrier bandwidth for the second SCS corresponding to the initial uplink BWP. In this description, optionally, the carrier bandwidth may be understood as a cell bandwidth.

It should be noted that information indicated in the first information is not limited to being indicated in the first information, and may alternatively be included in other information. In this disclosure, only the first information is used as an example for description. This description is not limited to being included in same information.

The first information may be but is not limited to SI sent by a base station to the UE. For example, the first information may be an SIB1 in the SI, or carried/included in an SIB1.

In a possible implementation, S302: When a first condition corresponding to the first information is not met, the UE selects or reselects a cell on a same frequency as the first cell.

For example, it may be understood that the first condition is not specific to the frequency band or the frequency.

That the first condition is not specific to the frequency band or the frequency may be understood as the first condition is not a frequency band or frequency-related condition, or the first condition is not a condition for determining the frequency band or the frequency granularity.

For example, that the first condition is not a condition for determining the frequency band or the frequency granularity may be understood as for the different cells on the same frequency band or frequency, determining results of the first condition are not necessarily the same, may not be exactly the same, or may be different.

The first condition is used to determine whether the UE can access the first cell.

Whether the first cell can be accessed may be understood as/include whether the first cell can be camped on.

It may be understood that when the first condition corresponding to the first information is not met, the UE cannot access the first cell.

It may be understood that when the first condition corresponding to the first information is met, the UE may/has an opportunity to access the first cell.

For example, that the UE cannot access the first cell may include/be understood as the UE cannot camp on the first cell, and/or the UE considers the first cell as barred.

That the UE considers the first cell as barred may include any one or more of the UE cannot access/camp on the first cell; the UE may exclude the first cell (or a barred cell) as a candidate cell for cell selection/reselection; the UE may exclude the first cell (or a barred cell) as a candidate cell for cell selection/reselection within first duration; or the UE may exclude the first cell (or a barred cell) as a candidate cell for cell selection/reselection within a maximum of first duration.

The first duration may be configured by a network device, pre-configured, or defined in a protocol, or set by the UE before delivery. This is not limited in this description. For example, the first duration may be 300 seconds.

For example, the UE may exclude the first cell (or the barred cell) as the candidate cell for cell selection/reselection within 300 seconds.

For example, the UE may exclude the first cell (or the barred cell) as the candidate cell for cell selection/reselection within a maximum of 300 seconds.

That a first condition corresponding to the first information is not met may include/be understood as UE/UE information/UE capability/information obtained by the UE (for example, information/configuration information obtained by the UE from the network device)/configuration information of the network device does not meet the first condition corresponding to the first information, or information configured by the base station for the UE does not meet the first condition corresponding to the first information.

For example, a channel bandwidth supported by the UE does not meet the first condition.

The cell on the same frequency as the first cell may include/be understood as any one or more of the first cell, other cells on the same frequency as the first cell, another cell on the same frequency as the first cell, all cells on the same frequency as the first cell, and some cells on the same frequency as the first cell.

That the UE selects or reselects a cell on a same frequency as the first cell may include/be understood as any one or more of the UE is allowed to select or reselect the cell on the same frequency as the first cell; if a selection criterion or reselection criterion is met, the UE may select or reselect the cell on the same frequency as the first cell; and intra-frequency reselection is allowed, or the UE is allowed to perform intra-frequency reselection.

For content related to the selection criteria and reselection criteria, refer to 3GPP TS 38.304: "NR; User Equipment (UE) procedures in Idle mode and RRC Inactive state".

For example, the first condition may include any one or more of the UE supports (the bandwidth of) the initial downlink BWP; the UE supports (the bandwidth of) the initial uplink BWP; the UE can operate on the initial downlink BWP; and the UE can operate on the initial uplink BWP.

"The UE supports (the bandwidth of) the initial downlink BWP or the UE can operate on the initial downlink BWP" includes any one or more of the channel bandwidth supported by the UE is wider than or equal to the bandwidth of the initial downlink BWP, and/or the channel bandwidth supported by the UE is smaller than or equal to the carrier bandwidth.

Optionally, that the channel bandwidth supported by the UE is wider than or equal to the bandwidth of the initial downlink BWP includes that the channel bandwidth supported by the UE includes the bandwidth of the initial downlink BWP.

Optionally, that the channel bandwidth supported by the UE is smaller than or equal to the carrier bandwidth includes that the carrier bandwidth includes the channel bandwidth supported by the UE.

For example, that the channel bandwidth supported by the UE includes the bandwidth of the initial downlink BWP may be understood as any one or more of the channel bandwidth supported by the UE includes the bandwidth of the initial downlink BWP, the channel bandwidth supported by the UE can cover the bandwidth of the initial downlink BWP, and the bandwidth of the initial downlink BWP is completely within a frequency domain range of the channel bandwidth supported by the UE.

For example, that the carrier bandwidth includes the channel bandwidth supported by the UE may be understood as any one or more of the carrier bandwidth includes the channel bandwidth supported by the UE, the carrier bandwidth can cover the channel bandwidth supported by the UE, and the channel bandwidth supported by the UE is completely within the frequency domain range of the carrier bandwidth.

For example, that the first condition is not met or "the UE does not support (the bandwidth of) the initial downlink BWP or the UE cannot operate on the initial downlink BWP" includes any one or more of the channel bandwidth supported by the UE is smaller than the bandwidth of the initial downlink BWP; the channel bandwidth supported by the UE is wider than the carrier bandwidth; the channel bandwidth supported by the UE does not include the bandwidth of the initial downlink BWP; and the carrier bandwidth does not include the channel bandwidth supported by the UE.

That "the UE supports (the bandwidth of) the initial uplink BWP or the UE can operate on the initial uplink BWP" includes any one or more of the channel bandwidth supported by the UE is wider than or equal to the bandwidth of the initial uplink BWP, and/or the channel bandwidth supported by the UE is smaller than or equal to the carrier bandwidth.

Optionally, that the channel bandwidth supported by the UE is wider than or equal to the bandwidth of the initial uplink BWP includes that the channel bandwidth supported by the UE includes the bandwidth of the initial uplink BWP.

Optionally, that the channel bandwidth supported by the UE is smaller than or equal to the carrier bandwidth includes that the carrier bandwidth includes the channel bandwidth supported by the UE.

For example, that the channel bandwidth supported by the UE includes the bandwidth of the initial uplink BWP may be understood as any one or more of the channel bandwidth supported by the UE includes the bandwidth of the initial uplink BWP, the channel bandwidth supported by the UE can cover the bandwidth of the initial uplink BWP, and the bandwidth of the initial uplink BWP is completely within the frequency domain range of the channel bandwidth supported by the UE.

For example, that the first condition is not met or "the UE does not support (the bandwidth of) the initial uplink BWP or the UE cannot operate on the initial uplink BWP" includes any one or more of the channel bandwidth supported by the UE is smaller than the bandwidth of the initial uplink BWP; the channel bandwidth supported by the UE is wider than the carrier bandwidth; the channel bandwidth supported by the UE does not include the bandwidth of the initial uplink BWP; and the carrier bandwidth does not include the channel bandwidth supported by the UE.

For example, the following uses the channel bandwidth supported by the UE and the initial downlink BWP as examples to describe meanings of inclusion and exclusion.

A boundary of the channel bandwidth supported by the UE includes a first boundary and a second boundary, where the first boundary is less than the second boundary. A boundary of the initial downlink BWP includes a third boundary and a fourth boundary, where the third boundary is less than the fourth boundary. Optionally, the first boundary/the third boundary may be referred to as a left boundary or a lower boundary. Optionally, the second boundary/the fourth boundary may be referred to as a right boundary or an upper boundary.

The boundary may be understood as a boundary of a frequency range, a frequency boundary, or a start point of the frequency.

For example, when the channel bandwidth supported by the UE includes the initial downlink BWP, a relationship between the channel bandwidth supported by the UE and the initial downlink BWP may include an inclusion relationship and/or an equality relationship.

(1) Inclusion relationship: The channel bandwidth supported by the UE includes the initial downlink BWP.

That the channel bandwidth supported by the UE includes the initial downlink BWP may be understood as the third boundary is greater than or equal to the first boundary, and the fourth boundary is less than or equal to the second boundary.

(2) Equality relationship: The channel bandwidth supported by the UE is equal to the initial downlink BWP.

That the channel bandwidth supported by the UE is equal to the initial downlink BWP may be understood as the first boundary is equal to the third boundary, and the second boundary is equal to the fourth boundary.

For example, when the channel bandwidth supported by the UE does not include the initial downlink BWP, the relationship between the channel bandwidth supported by the UE and the initial downlink BWP may include an intersection relationship or a nonintersection relationship.

(1) Intersection relationship: There is an intersection between the channel bandwidth supported by the UE and the initial downlink BWP.

The intersection between the channel bandwidth supported by the UE and the initial downlink BWP may be understood as any one of the following:

(a) The third boundary is greater than the first boundary and less than the second boundary, and the fourth boundary is greater than the second boundary.

(b) The first boundary is greater than the third boundary and less than the fourth boundary, and the second boundary is greater than the fourth boundary.

(2) Nonintersection relationship: There is no intersection between the channel bandwidth supported by the UE and the initial downlink BWP.

Nonintersection between the channel bandwidth supported by the UE and the initial downlink BWP may be understood as any one of the following:

(a) The third boundary is greater than or equal to the second boundary.

(b) The first boundary is greater than or equal to the fourth boundary.

Optionally, it may be understood that the channel bandwidth supported by the UE may be understood as a channel bandwidth supported by the UE (for example, a first channel bandwidth supported by the UE).

Optionally, the channel bandwidth supported by the UE may include any one or more of a downlink channel bandwidth supported by the UE (for example, first downlink channel bandwidth supported by the UE), or an uplink channel bandwidth supported by the UE (for example, a first uplink channel bandwidth supported by the UE).

Optionally, the channel bandwidth supported by the UE may include any one or more of a maximum transmission bandwidth configuration of the channel bandwidth supported by the UE, a transmission bandwidth configuration of the channel bandwidth supported by the UE, a maximum transmission bandwidth of the channel bandwidth supported by the UE, or a transmission bandwidth of the channel bandwidth supported by the UE.

Optionally, the downlink channel bandwidth supported by the UE may include any one or more of a maximum transmission bandwidth configuration of the downlink channel bandwidth supported by the UE, a transmission bandwidth configuration of the downlink channel bandwidth supported by the UE, a maximum transmission bandwidth of the downlink channel bandwidth supported by the UE, or a transmission bandwidth of the downlink channel bandwidth supported by the UE.

Optionally, the uplink channel bandwidth supported by the UE may include any one or more of a maximum transmission bandwidth configuration of the uplink channel bandwidth supported by the UE, a transmission bandwidth configuration of the uplink channel bandwidth supported by the UE, a maximum transmission bandwidth of the uplink channel bandwidth supported by the UE, or a transmission bandwidth of the uplink channel bandwidth supported by the UE.

In this description, optionally, the carrier bandwidth may include a carrier bandwidth for an SCS. For example, the carrier bandwidth is the carrier bandwidth for the first SCS corresponding to the initial downlink BWP, or the carrier bandwidth is the carrier bandwidth for the second SCS corresponding to the initial uplink BWP.

In this description, optionally, the carrier bandwidth may be understood as the cell bandwidth.

For example, the first condition includes any one or more of the following:

(1) the channel bandwidth supported by the UE is wider than or equal to the bandwidth of the initial uplink BWP, and/or the channel bandwidth supported by the UE is smaller than or equal to the carrier bandwidth; and (2) the channel bandwidth supported by the UE is wider than or equal to the bandwidth of the initial uplink BWP, and/or the channel bandwidth supported by the UE is smaller than or equal to the carrier bandwidth.

For example, the first condition includes that the channel bandwidth supported by the UE is wider than or equal to the bandwidth of the initial downlink BWP, and the channel bandwidth supported by the UE is smaller than or equal to the carrier bandwidth.

For example, the first condition includes that the channel bandwidth supported by the UE is wider than or equal to the bandwidth of the initial uplink BWP, and the channel bandwidth supported by the UE is smaller than or equal to the carrier bandwidth.

For example, the first condition includes:

(1) the channel bandwidth supported by the UE is wider than or equal to the bandwidth of the initial uplink BWP, and the channel bandwidth supported by the UE is smaller than or equal to the carrier bandwidth; and (2) the channel bandwidth supported by the UE is wider than or equal to the bandwidth of the initial uplink BWP, and the channel bandwidth supported by the UE is smaller than or equal to the carrier bandwidth.

In this embodiment of this description, when the first condition corresponding to the first information is not met, the UE selects or reselects the cell on the same frequency as the first cell. This avoids/reduces (a probability/degree) that the UE misses the cell (for example, another cell, a suitable cell, or a cell that can be accessed/camped on) on a same frequency (for example, the same frequency as the first cell), thereby improving cell access performance of the UE. For example, a cell selection/reselection process can be accelerated. For example, an initial access process can be accelerated. For example, power consumption of the UE can be reduced.

In some embodiments, the cell selection or reselection method provided in this embodiment of this description further includes:

S303: The UE obtains first indication information, where the first indication information indicates that the UE is allowed or disallowed to select or reselect the cell on the same frequency as the first cell (or whether intra-frequency reselection is allowed) when the first cell is barred or is considered as barred by the UE. Correspondingly, for example, the network device sends the first indication information to the UE.

For example, a function of the first indication information may also be understood as when a cell, a highest ranked cell, or the first cell is barred or barred by the UE, the first indication information is used to control selection/reselection of the intra-frequency cell (or is used to control intra-frequency reselection).

The highest ranked cell may also be understood as a cell that ranks first (for example, a highest ranked cell), for example, a cell with best signal strength.

The highest ranked cell or the cell that ranks first may also be replaced with a best cell (for example, a best cell). For example, the first cell may be understood as a cell or a highest ranked cell.

"When the first cell is barred or considered as barred by the UE" may include/be understood as/be replaced with when the cell or the highest ranked cell (highest ranked cell) or the first cell is barred or barred by the UE.

For example, the network device may consider burden and/or interference (for example, co-channel interference) factors when setting the first indication information.

For example, if load of the cell on the same frequency as the first cell is heavy and access of the UE is not expected, the network device may set the first indication information corresponding to the first cell to "disallowed". For example, if the load of the cell on the same frequency as the first cell is light and the UE may access these cells, the network device may set the first indication information corresponding to the first cell to "allowed".

For example, a signal of the first cell is strong. If the UE cannot access the first cell, or if the UE accesses another cell on the same frequency as the first cell, strong interference may be caused. The network device may set the first indication information corresponding to the first cell to "disallowed".

"Disallowed" indicates that the UE is disallowed to select or reselect the cell on the same frequency as the first cell when the first cell is barred or is considered as barred by the UE.

"Allowed" indicates that, when the first cell is barred or is considered as barred by the UE, the UE is allowed to select or reselect the cell on the same frequency as the first cell.

For simplicity of description, the first indication information indicates that the UE is disallowed to select or reselect the cell on the same frequency as the first cell when the first cell is barred or is considered as barred by the UE. This may be simplified as that the first indication information indicates "disallowed".

For simplicity of description, the first indication information indicates that the UE is allowed to select or reselect the cell on the same frequency as the first cell when the first cell is barred or is considered as barred by the UE. This may be simplified as that the first indication information indicates "allowed".

"Allowed" indicates that the UE is allowed to select or reselect the cell on the same frequency as the first cell when the first cell is barred or is considered as barred by the UE.

For example, the first indication information may be an intra-frequency reselection field in an MIB.

For example, the first indication information may be included in the MIB, but is not limited to the MIB, or may be included in the SIB1 or another message (for example, a physical layer message (for example, downlink control indicator (DCI)), a MAC layer message (for example, a MAC control element (CE)), a broadcast message (for example, system information), or an RRC message (for example, proprietary information)).

In actual application, for example, in another possible implementation (for example, a scenario in which the load of the cell on the same frequency as the first cell is considered), S302 may be implemented by using/selecting to use the first indication information.

Correspondingly, in another possible implementation, S302 may be replaced with when the UE does not meet the first condition, the UE determines, based on the first indication information, to select or reselect the cell on the same frequency as the first cell, or determines, based on the first indication information, not to select or not to reselect the cell on the same frequency as the first cell.

That the terminal device determines, based on the first indication information, to select or reselect the cell on the same frequency as the first cell includes: When the first indication information indicates "allowed", the terminal device determines to select or reselect the cell on the same frequency as the first cell.

That the terminal device determines, based on the first indication information, not to select or not to reselect the cell on the same frequency as the first cell includes that when the first indication information indicates "disallowed", the terminal device determines not to select or not to reselect the cell on the same frequency as the first cell.

In this description, "indicate" may be replaced/understood as set to.

That the terminal device determines to select or reselect the cell on the same frequency as the first cell may include/be replaced with/be understood as any one or more of the terminal device determines that selection or reselection of the cell on the same frequency as the first cell is allowed; the terminal device is allowed to select or reselect the cell on the same frequency as the first cell; the terminal device selects or reselects the cell on the same frequency as the first cell; the terminal device determines that intra-frequency reselection is allowed, or the terminal device determines that intra-frequency reselection is allowed to be performed; and intra-frequency reselection is allowed, or (the terminal device) is allowed to perform intra-frequency reselection.

For example, it may be understood that, for a case in which the terminal device determines to select or reselect the cell on the same frequency as the first cell, the terminal device may select or reselect the cell on the same frequency as the first cell, or the terminal device may not select or reselect the cell on the same frequency as the first cell. The terminal device has a right to select/reselect the cell on the same frequency as the first cell, but is not limited to selecting or reselecting the cell on the same frequency as the first cell.

That the terminal device determines not to select or not to reselect the cell on the same frequency as the first cell may include/be replaced with/be understood as any one or more of the terminal device determines that selection or reselection of the cell on the same frequency as the first cell is disallowed; the terminal device is disallowed to select or reselect the cell on the same frequency as the first cell; the terminal device does not select or reselect the cell on the same frequency as the first cell; the terminal device determines that intra-frequency reselection is disallowed; the terminal device determines that intra-frequency reselection is disallowed to be performed; intra-frequency reselection is disallowed, or (the terminal device) is disallowed to perform intra-frequency reselection.

That the terminal device does not select or reselect the cell on the same frequency as the first cell may include/be replaced with/be understood as any one or more of the terminal device is disallowed to select or reselect the cell on the same frequency as the first cell; and intra-frequency reselection is disallowed or (the terminal device) is disallowed to perform intra-frequency reselection.

In this description, disallowed may be understood as cannot or barred.

Optionally, that the terminal device does not select or reselect the cell on the same frequency as the first cell may include/be replaced with/be understood as the terminal device may exclude the cell (or the barred cell) on the same frequency as the first cell as the candidate cell for cell selection/reselection; the terminal device may exclude the cell (or the barred cell) on the same frequency as the first cell as the candidate cell for cell selection/reselection within second duration; or the terminal device may exclude the cell (or the barred cell) on the same frequency as the first cell as the candidate cell for cell selection/reselection within a maximum of second duration.

The second duration may be configured by the network device, pre-configured, defined in the protocol, or set by the terminal device before delivery. This is not limited in this description. For example, the second duration may be 300 seconds.

For example, the terminal device may exclude the cell (or the barred cell) on the same frequency as the first cell as the candidate cell within cell selection/reselection within 300 seconds.

For example, the terminal device may exclude the cell (or the barred cell) on the same frequency as the first cell as the candidate cell for cell selection/reselection within a maximum of 300 seconds.

Optionally, that the terminal device does not select or reselect the cell on the same frequency as the first cell may include/be replaced with/be understood as the terminal device determines a first frequency as a frequency with a low priority/lowest priority; the terminal device determines a first frequency as a frequency with a low priority/lowest priority within third duration; or the terminal device determines a first frequency as a frequency with a low priority/lowest priority within a maximum of third duration.

For example, the first frequency is a frequency corresponding to the first cell or a frequency of the first cell.

That the terminal device determines a first frequency as a frequency with a low priority/lowest priority may include/be replaced with/be understood as the terminal device considers the first frequency as the frequency with the low priority/lowest priority.

The third duration may be configured by the network device, pre-configured, defined in the protocol, or set by the terminal device before delivery. This is not limited in this description. For example, the third duration may be 300 seconds.

For example, when the first condition is not met, the terminal device determines, based on the first indication information, that selection or reselection of the cell on the same frequency as the first cell is allowed, which includes two cases. In a first case, the terminal device may select or reselect the cell on the same frequency as the first cell. In a second case, the terminal device may not select or reselect the cell on the same frequency as the first cell. This is not limited in this description.

For example, when the first condition is not met, the terminal device determines, based on the first indication information, that selection or reselection of the cell on the same frequency as the first cell is disallowed, which includes one case in which the terminal device cannot select or reselect the cell on the same frequency as the first cell.

In this implementation, the first condition is a condition corresponding to the first information. For specific content, refer to related descriptions in the foregoing implementation. Details are not described herein again.

In this embodiment of this description, when the first condition corresponding to the first information is not met, the terminal device determines to select or reselect the cell on the same frequency as the first cell based on indication content of the first indication information, or determines, based on indication content of the first indication information, not to select or not to reselect the cell on the same frequency as the first cell. In this way, (the probability/degree) that the terminal device misses the cell (for example, the another cell, the suitable cell, or the cell that can be accessed/camped on) on the same frequency (for example, the same frequency as the first cell) is avoided/reduced, thereby improving the cell access performance of the terminal device. For example, the cell selection/reselection process can be accelerated. For example, the initial access process can be accelerated. For example, the power consumption of the terminal device can be reduced.

In some embodiments, the cell selection or reselection method provided in this embodiment of this description further includes:

S304: The terminal device obtains second indication information, where the second indication information indicates that the terminal device is allowed or disallowed to select or reselect the cell on the same frequency as the first cell (or whether intra-frequency reselection is allowed) when the first cell is barred or considered as barred because the first condition is not met; or indicates that first information corresponding to the cell on the same frequency as the first cell is different from or the same as the first information corresponding to the first cell. Correspondingly, for example, the network device sends the second indication information to the terminal device.

For example, a function of the second indication information may also be understood as because the terminal device does not meet the first condition, the terminal device cannot access the first cell (or the first cell is barred or is barred by the terminal device). In this case, the second indication information is used to control intra-frequency cell selection/reselection (or used to control intra-frequency reselection).

For example, the network device may set the second indication information to "allowed" or "disallowed".

If the second indication information is set to "allowed", it indicates that the terminal device is allowed to select or reselect the cell on the same frequency as the first cell when the first cell is barred or considered as barred because the first condition is not met.

If the second indication information is set to "disallowed", it indicates that the terminal device is disallowed to select or reselect the cell on the same frequency as the first cell when the first cell is barred or considered as barred because the first condition is not met.

For example, the network device may set the second indication information to "same" or "different".

If the second indication information is set to "same", it indicates that the first information corresponding to the cell on the same frequency as the first cell is the same as the first information corresponding to the first cell.

That the first information corresponding to the cell on the same frequency as the first cell is the same as the first information corresponding to the first cell may include/be replaced with/be understood as any one or more of first information corresponding to cells on the first frequency/cells greater than or equal to X percent (or cells less than or equal to X percent) on the first frequency/a cell greater than or equal to N cells (or a cell less than or equal to N cells) on the first frequency is the same as the first information corresponding to the first cell; and the first information corresponding on the cell on the same frequency as the first cell (for example, all cells, all cells other than the first cell, some cells (for example, cells greater than or equal to X percent (or cells less than or equal to X percent)), a cell greater than or equal to N cells (or a cell less than or equal to N cells), or one cell) is the same as the first information corresponding to the first cell.

If the second indication information is set to "different", it indicates that the first information corresponding to the cell on the same frequency as the first cell is different from the first information corresponding to the first cell.

That the first information corresponding to the cell on the same frequency as the first cell is different from the first information corresponding to the first cell may include/be replaced with/be understood as any one or more of the first information corresponding to the cells on the first frequency/frequency band/the cells greater than or equal to the X percent (or the cells less than or equal to the X percent) on the first frequency/frequency band/the cell greater than or equal to the N cells (or the cell less than or equal to the N cells) on the first frequency/frequency band is different from the first information corresponding to the first cell; and the first information corresponding on the cell on the same frequency as the first cell (for example, all the cells, all the cells other than the first cell, some cells (for example, the cells greater than or equal to X percent (or the cells less than or equal to X percent)), the cell greater than or equal to the N cells (or the cell less than or equal to the N cells), or the cell) is different from the first information corresponding to the first cell.

Values of X and N may be configured by the network device, pre-configured, defined in the protocol, or set by the UE before delivery. This is not limited in this description. For example, X may be 70, 80, 90. For example, N may be 20, 50, 100.

For example, the first frequency band is a frequency band corresponding to the first cell or a frequency band of the first cell.

For simplicity of description, the second indication information indicates that the UE is disallowed to select or reselect the cell on the same frequency as the first cell when the first cell is barred or considered as barred because the first condition is not met. This may be simplified as that the second indication information indicates "disallowed".

For simplicity of description, the second indication information indicates that the UE is allowed to select or reselect the cell on the same frequency as the first cell when the first cell is barred or considered as barred because the first condition is not met. This may be simplified as that the second indication information indicates "allowed".

For simplicity of description, the second indication information indicates that the first information corresponding to the cell on the same frequency as the first cell is the same as the first information corresponding to the first cell. This may be simplified as that the second indication information indicates "same".

For simplicity of description, the second indication information indicates that the first information corresponding to the cell on the same frequency as the first cell is different from the first information corresponding to the first cell. This may be simplified as that the second indication information indicates "different".

For example, the second indication information may be included in the SIB1, but is not limited to the SIB1, or may be included in the another message (for example, the physical layer message (for example, the DCI), the MAC layer message (for example, the MAC CE), the broadcast message (for example, the system information), or the RRC message (for example, the proprietary information)).

In actual application, for example, in another possible implementation (for example, a scenario in which the first information is not limited to the frequency band or the frequency is considered), S302 may be implemented by using/selecting to use the second indication information.

It may be understood that, that the first information is not limited to the frequency band or the frequency may be understood as/replaced with the first information is not information that defines the frequency band or the frequency.

Correspondingly, in another possible implementation, S302 may be replaced with when the UE does not meet the first condition, the UE determines, based on the second indication information, to select or reselect the cell on the same frequency as the first cell, or determines, based on the second indication information, not to select or not to reselect the cell on the same frequency as the first cell.

That the UE determines, based on the second indication information, to select or reselect the cell on the same frequency as the first cell includes that when the second indication information indicates "allowed" or "different", the UE determines to select or reselect the cell on the same frequency as the first cell.

That the UE determines, based on the second indication information, not to select or not to reselect the cell on the same frequency as the first cell includes that when the second indication information indicates "disallowed" or "same", the UE determines not to select or not to reselect the cell on the same frequency as the first cell.

For related content that the UE determines to select or reselect the cell on the same frequency as the first cell, refer to related descriptions in the foregoing implementation. Details are not described herein again.

For related content that the UE determines not to select or not to reselect the cell on the same frequency as the first cell, refer to related descriptions in the foregoing implementation. Details are not described herein again.

Related descriptions in the foregoing implementation are also applicable herein, and details are not described herein again.

For example, when the first condition is not met, the UE determines, based on the second indication information, that selection or reselection of the cell on the same frequency as the first cell is allowed, which includes two cases. In a first case, the UE may select or reselect the cell on the same frequency as the first cell. In a second case, the UE may not select or reselect the cell on the same frequency as the first cell. This is not limited in this description.

For example, when the first condition is not met, the UE determines, based on the second indication information, that selection or reselection of the cell on the same frequency as the first cell is disallowed, which includes one case in which the UE cannot select or reselect the cell on the same frequency as the first cell.

In this implementation, the first condition is a condition corresponding to the first information. For specific content, refer to related descriptions in the foregoing implementation. Details are not described herein again.

In this embodiment of this description, when the first condition corresponding to the first information is not met, the UE determines to select or reselect the cell on the same frequency as the first cell based on indication content of the second indication information, or determines not to select or not to reselect the cell on the same frequency as the first cell based on indication content of the second indication information. In this way, (the probability/degree) that the UE misses the cell (for example, the another cell, the suitable cell, or the cell that can be accessed/camped on) on the same frequency (for example, the same frequency as the first cell) is avoided/reduced, thereby improving the cell access performance of the UE. For example, the cell selection/reselection process can be accelerated. For example, the initial access process can be accelerated. For example, the power consumption of the UE can be reduced.

In some embodiments, the UE may obtain both the first indication information and the second indication information. The cell selection or reselection method provided in this embodiment of this description further includes:

S305: The UE obtains the first indication information and the second indication information. Correspondingly, for example, the network device sends the first indication information and the second indication information to the UE.

For related content of the first indication information and the second indication information, refer to the foregoing descriptions. Details are not described herein again.

Correspondingly, in another possible implementation, S302 may be replaced with when the UE does not meet the first condition, the UE determines, based on the first indication information and the second indication information, to select or reselect the cell on the same frequency as the first cell, or determines, based on the first indication information and the second indication information, not to select or not to reselect the cell on the same frequency as the first cell.

That the UE determines, based on the first indication information and the second indication information, to select or reselect the cell on the same frequency as the first cell, or determines, based on the first indication information and the second indication information, not to select or not to reselect the cell on the same frequency as the first cell includes that when both the first indication information and the second indication information indicate "allowed" and/or "different", the UE determines to select or reselect the cell on the same frequency as the first cell. If at least one of the first indication information and the second indication information indicates "disallowed" or "same", the UE determines not to select or not to reselect the cell on the same frequency as the first cell.

There may be the following cases:

In a first case, when the first indication information indicates "allowed", and the second indication information indicates "allowed" or "different", the UE determines to select or reselect the cell on the same frequency as the first cell.

In a second case, when the first indication information indicates "allowed", and the second indication information indicates "disallowed" or "same", the UE determines not to select or not to reselect the cell on the same frequency as the first cell.

In a third case, when the first indication information indicates "disallowed", and the second indication information indicates "allowed" or "different", the UE determines not to select or not to reselect the cell on the same frequency as the first cell.

In a fourth case, when the first indication information indicates "disallowed", and the second indication information indicates "disallowed" or "same", the UE determines not to select or not to reselect the cell on the same frequency as the first cell.

For content related to the first indication information and the second indication information, and related explanations about "the UE determines to select or reselect the cell on the same frequency as the first cell", and "the UE determines not to select or not to reselect the cell on the same frequency as the first cell", refer to the foregoing descriptions. Details are not described herein again.

For related content that the UE determines to select or reselect the cell on the same frequency as the first cell, refer to related descriptions in the foregoing implementation. Details are not described herein again.

For related content that the UE determines not to select or not to reselect the cell on the same frequency as the first cell, refer to related descriptions in the foregoing implementation. Details are not described herein again.

Related descriptions in the foregoing implementation are also applicable herein, and details are not described herein again.

In this implementation, the first condition is a condition corresponding to the first information. For specific content, refer to related descriptions in the foregoing implementation. Details are not described herein again.

For example, when the first condition is not met, the UE determines, based on the first indication information and the second indication information, that selection or reselection of the cell on the same frequency as the first cell is allowed, which includes two cases. In a first case, the UE may select or reselect the cell on the same frequency as the first cell. In a second case, the UE may not select or reselect the cell on the same frequency as the first cell. This is not limited in this description.

For example, when the first condition is not met, the UE determines, based on the first indication information and the second indication information, that selection or reselection of the cell on the same frequency as the first cell is disallowed, which includes one case in which the UE cannot select or reselect the cell on the same frequency as the first cell.

In this embodiment of this description, when the first condition corresponding to the first information is not met, the UE determines to select or reselect the cell on the same frequency as the first cell based on the indication content of the first indication information and the indication content of the second indication information, or determines not to select or not to reselect the cell on the same frequency as the first cell based on the indication content of the first indication information and the indication content of the second indication information. In this way, (the probability/degree) that the UE misses the cell (for example, the another cell, the suitable cell, or the cell that can be accessed/camped on) on the same frequency (for example, the same frequency as the first cell) is avoided/reduced, thereby improving the cell access performance of the UE. For example, the cell selection/reselection process can be accelerated. For example, the initial access process can be accelerated. For example, the power consumption of the UE can be reduced.

In some embodiments, the cell selection or reselection method provided in this embodiment of this description further includes:

S306: The UE obtains second information corresponding to the first cell.

For example, the second information is specific to a frequency band or a frequency.

"The second information is specific to a frequency band or a frequency" may be understood as: The second information is limited to/is information that defines the frequency band or the frequency, or the second information is information about the frequency band or the frequency granularity.

For example, that the second information is limited to/is information that defines the frequency band or the frequency may be understood as the second information is information related to the frequency band or the frequency.

For example, that the second information is information about the frequency band or the frequency granularity may be understood as second information of different cells on a same frequency band or frequency is the same or completely the same.

For example, the second information may indicate any one or more of information about the frequency band corresponding to the first cell, information about a transmission requirement of the frequency band corresponding to the first cell, and dynamic spectrum sharing information of the frequency band of the first cell.

It should be noted that information indicated in the second information is not limited to being indicated in the second information, and may alternatively be included in other information. In this description, the second information is used as an example for description. This description is not limited to being included in same information.

The second information may be but is not limited to SI sent by the base station to the UE. For example, the second information may be an SIB1 in the SI, or carried/included in an SIB1. For example, the second information may alternatively be included in the another message (for example, the physical layer message (for example, the DCI), the MAC layer message (for example, the MAC CE), the broadcast message (for example, the system information)), or the RRC message (for example, the proprietary information).

Correspondingly, in a possible implementation, S302 may be replaced with When the first condition is not met and a second condition corresponding to the second information is met, the UE is allowed to select or reselect the cell on the same frequency as the first cell.

For example, it may be understood that the second condition is specific to the frequency band or the frequency.

That the second condition is specific to the frequency band or the frequency may be understood as the second condition is a frequency band or frequency-related condition, or the second condition is a condition for determining the frequency band or the frequency granularity.

For example, that the second condition is a condition for determining the frequency band or the frequency granularity may be understood as follows: For the different cells on the same frequency band or frequency, determining results of the second condition are the same or completely the same.

The second condition is used to determine whether the UE can access the first cell.

It may be understood that, when the second condition corresponding to the second information is not met, the UE cannot access the first cell.

It may be understood that, when the second condition corresponding to the second information is met, the UE may/has an opportunity to access the first cell.

For example, that the UE can access the first cell may include/be understood as the UE can camp on the first cell, and/or that the UE considers the first cell as a cell allowed to access.

For related descriptions that "the UE cannot access the first cell", refer to the foregoing related content, and details are not described herein again.

That a second condition corresponding to the second information is met may be understood as the UE/UE information/UE capability/information obtained by the UE (for example, the information/configuration information obtained by the UE from the network device)/configuration information of the network device meets the second condition corresponding to the second information, or the information configured by the base station for the UE meets the second condition corresponding to the second information.

The second condition includes any one or more of the following:

(1) the UE supports the frequency band corresponding to the first cell;

(2) the UE supports the transmission requirement of the frequency band corresponding to the first cell; and (3) the network device indicates to disable NR uplink transmission with a 7.5 k frequency shift to an LTE raster; or the network device indicates to enable NR uplink transmission with a 7.5 k frequency shift to an LTE raster and the UE supports the 7.5 kHz frequency shift.

NR uplink transmission with a 7.5 k frequency shift to an LTE raster may be understood as dynamic spectrum sharing or dynamic spectrum sharing in an NR TDD frequency band (for example, a frequency band n48, n38, or n40).

That the UE supports the frequency band corresponding to the first cell may include/be replaced with/be understood as any one or more of the UE supports one or more frequency bands corresponding to the first cell; the UE supports one or more downlink bands; and the UE supports one or more uplink bands corresponding to the first cell. The bands supported by the UE are not downlink only bands. The UE supports one or more frequency bands corresponding to the first cell for downlink. The UE supports the one or more frequency bands corresponding to the first cell for uplink.

For example, that the UE supports the frequency band corresponding to the first cell may include that the UE supports one or more frequency bands corresponding to the first cell for DL for TDD; the UE supports one or more DL frequency bands corresponding to the first cell for TDD; the UE supports one or more frequency bands corresponding to the first cell for DL for TDD, and these frequency bands are not downlink only bands; or the UE supports one or more DL frequency bands corresponding to the first cell for TDD, and these frequency bands are not downlink only bands.

For example, that the UE supports the frequency band corresponding to the first cell may include that the UE supports one or more frequency bands corresponding to the first cell for UL for FDD; the UE supports one or more UL frequency bands corresponding to the first cell for FDD; the UE supports one or more frequency bands corresponding to the first cell for UL for FDD, and these frequency bands are not downlink only bands; the UE supports one or more UL frequency bands corresponding to the first cell for FDD, and these frequency bands are not downlink only bands; the UE supports one or more frequency bands corresponding to the first cell for UL for FDD, and the UE supports one or more frequency bands corresponding to the first cell for DL; for FDD, the UE supports one or more UL frequency bands corresponding to the first cell, and the UE supports one or more DL frequency bands corresponding to the first cell; the UE supports one or more frequency bands corresponding to the first cell for UL for FDD, and the UE supports one or more frequency bands corresponding to the first cell for DL, and these frequency bands are not downlink only bands; or for FDD, the UE supports one or more UL frequency bands corresponding to the first cell, and the UE supports one or more DL frequency bands corresponding to the first cell and these frequency bands are not downlink only bands.

That the UE supports the transmission requirement of the frequency band corresponding to the first cell may include/be replaced with/be understood as for the frequency band (for example, one frequency band) supported by the UE, the UE supports the transmission requirement corresponding to the frequency band (for example, one or more transmission requirements or at least one transmission requirement).

For example, that the UE supports the transmission requirement of the frequency band corresponding to the first cell may include that the UE supports the transmission requirement (for example, the one or more transmission requirements or the at least one transmission requirement) corresponding to the frequency band (for example, one frequency band) supported by the UE for DL for TDD; or the UE supports a transmission requirement (for example, one or more transmission requirements or at least one transmission requirement) corresponding to a DL frequency band (for example, one frequency band) supported by the UE for TDD.

The frequency band supported by the UE may be understood as a frequency band supported by the UE and corresponding to the first cell.

For example, that the UE supports the transmission requirement of the frequency band corresponding to the first cell may include that the UE supports the transmission requirement (for example, the one or more transmission requirements or the at least one transmission requirement) corresponding to the frequency band (for example, one frequency band) supported by the UE for UL for FDD; or the UE supports a transmission requirement (for example, one or more transmission requirements or at least one transmission requirement) corresponding to a UL frequency band (for example, one frequency band) supported by the UE for FDD.

For example, that the network device indicates to disable NR uplink transmission with a 7.5 k frequency shift to an LTE raster may include that for the frequency band (for example, one frequency band) supported by the UE, the network device indicates to disable NR uplink transmission with the 7.5 k frequency shift to the LTE raster; for the frequency band (for example, one frequency band) corresponding to the transmission requirement supported by the UE, the network device indicates to disable NR uplink transmission with the 7.5 k frequency shift to the LTE raster; for the frequency band (for example, one frequency band) supported by the UE and corresponding to the transmission requirement supported by the UE, the network device indicates to disable NR uplink transmission with the 7.5 k frequency shift to the LTE raster; for the frequency band (for example, one frequency band) supported by the UE, the network device indicates to disable NR uplink transmission with the 7.5 k frequency shift to the LTE raster for the TDD (for example, the frequency band n48, n38, or n40); for the frequency band (for example, one frequency band) corresponding to the transmission requirement supported by the UE, the network device indicates to disable NR uplink transmission with the 7.5 k frequency shift to the LTE raster for the TDD (for example, the frequency band n48, n38, or n40); or for the frequency band (for example, one frequency band) supported by the UE and corresponding to the transmission requirement supported by the UE, the network device indicates to disable NR uplink transmission with the 7.5 k frequency shift to the LTE raster for the TDD (for example, the frequency band n48, n38, or n40).

For example, that the network device indicates to enable NR uplink transmission with a 7.5 k frequency shift to an LTE raster and that the UE supports the 7.5 kHz frequency shift may include that for the frequency band (for example, one frequency band) supported by the UE, the network device indicates to enable NR uplink transmission with the 7.5 k frequency shift to the LTE raster and the UE supports the 7.5 kHz frequency shift; for the frequency band (for example, one frequency band) corresponding to the transmission requirement supported by the UE, the network device indicates to enable NR uplink transmission with the 7.5 k frequency shift to the LTE raster and the UE supports the 7.5 kHz frequency shift; for the frequency band (for example, one frequency band) supported by the UE and corresponding to the transmission requirement supported by the UE, the network device indicates to enable NR uplink transmission with the 7.5 k frequency shift to the LTE raster and the UE supports 7.5 kHz frequency shift; for the frequency band (for example, one frequency band) supported by the UE, the network device indicates to enable NR uplink transmission with the 7.5 k frequency shift to the LTE raster and the UE supports the 7.5 kHz frequency shift for the TDD (for example, the frequency band n48, n38, or n40); for the frequency band (for example, one frequency band) corresponding to the transmission requirement supported by the UE, the network device indicates to enable NR uplink transmission with the 7.5 k frequency shift to the LTE raster and the UE supports the 7.5 kHz frequency shift for the TDD (for example, the frequency band n48, n38, or n40); or for the frequency band (for example, one frequency band) supported by the UE and corresponding to the transmission requirement supported by the UE, the network device indicates to enable NR uplink transmission with the 7.5 k frequency shift to the LTE raster and the UE supports the 7.5 kHz frequency shift for the TDD (for example, the frequency band n48, n38, or n40).

For example, that the UE supports the 7.5 kHz frequency shift may include that for a 30 kHz SCS, the UE supports the 7.5 kHz frequency shift.

The first condition is a condition corresponding to the first information. For specific implementation, refer to related descriptions in the foregoing embodiment.

In this embodiment of this description, when the first condition is not met and the second condition corresponding to the second information is met, the UE selects or reselects the cell on the same frequency as the first cell. In this way, (the probability/degree) that the UE misses the cell (for example, the another cell, the suitable cell, or the cell that can be accessed/camped on) on the same frequency (for example, the same frequency as the first cell) is avoided/reduced, thereby improving the cell access performance of the UE. For example, the cell selection/reselection process can be accelerated. For example, the initial access process can be accelerated. For example, the power consumption of the UE can be reduced. For example, before selecting or reselecting the cell on the same frequency as the first cell, the UE determines that the second condition can be met (for example, it indicates that the UE cannot camp on the cell because the frequency band or frequency-related condition is not met), thereby avoiding a meaningless attempt to access the intra-frequency cell when the second condition is not met.

Correspondingly, in another possible implementation, S302 may be replaced with when the first condition is not met and the second condition corresponding to the second information is met, the UE determines, based on the first indication information, to select or reselect the cell on the same frequency as the first cell, or determines, based on the first indication information, not to select or not to reselect the cell on the same frequency as the first cell. In this way, (the probability/degree) that the UE misses the cell (for example, the another cell, the suitable cell, or the cell that can be accessed/camped on) on the same frequency (for example, the same frequency as the first cell) is avoided/reduced, thereby improving the cell access performance of the UE. For example, the cell selection/reselection process can be accelerated. For example, the initial access process can be accelerated. For example, the power consumption of the UE can be reduced. For example, before selecting or reselecting the cell on the same frequency as the first cell, the UE determines that the second condition can be met (for example, it indicates that the UE cannot camp on the cell because the frequency band or frequency-related condition is not met), thereby avoiding a meaningless attempt to access the intra-frequency cell when the second condition is not met.

Correspondingly, in another possible implementation, S302 may be replaced with when the first condition is not met and the second condition corresponding to the second information is met, the UE determines, based on the second indication information, to select or reselect the cell on the same frequency as the first cell, or determines, based on the second indication information, not to select or not to reselect the cell on the same frequency as the first cell. In this way, (the probability/degree) that the UE misses the cell (for example, the another cell, the suitable cell, or the cell that can be accessed/camped on) on the same frequency (for example, the same frequency as the first cell) is avoided/reduced, thereby improving the cell access performance of the UE. For example, the cell selection/reselection process can be accelerated. For example, the initial access process can be accelerated. For example, the power consumption of the UE can be reduced. For example, before selecting or reselecting the cell on the same frequency as the first cell, the UE determines that the second condition can be met (for example, it indicates that the UE cannot camp on the cell because the frequency band or frequency-related condition is not met), thereby avoiding a meaningless attempt to access the intra-frequency cell when the second condition is not met.

Correspondingly, in another possible implementation, S302 may be replaced with when the first condition is not met and the second condition corresponding to the second information is met, the UE determines, based on the first indication information and the second indication information, to select or reselect the cell on the same frequency as the first cell, or determines, based on the first indication information and the second indication information, not to select or not to reselect the cell on the same frequency as the first cell. In this way, (the probability/degree) that the UE misses the cell (for example, the another cell, the suitable cell, or the cell that can be accessed/camped on) on the same frequency (for example, the same frequency as the first cell) is avoided/reduced, thereby improving the cell access performance of the UE. For example, the cell selection/reselection process can be accelerated. For example, the initial access process can be accelerated. For example, the power consumption of the UE can be reduced. For example, before selecting or reselecting the cell on the same frequency as the first cell, the UE determines that the second condition can be met (for example, it indicates that the UE cannot camp on the cell because the frequency band or frequency-related condition is not met), thereby avoiding a meaningless attempt to access the intra-frequency cell when the second condition is not met.

Optionally, the first cell operates in an unlicensed spectrum and/or a licensed spectrum.

A third condition includes any one or more of the unlicensed spectrum, the first cell operates in the unlicensed spectrum, and the UE operates in the unlicensed spectrum. Alternatively, a third condition includes any one or more of the licensed spectrum, the first cell operates in the licensed spectrum, and the UE operates in the licensed spectrum.

Correspondingly, in a possible implementation, S302 may be replaced with when the first condition is not met and the second condition corresponding to the second information and/or the third condition are/is met, the UE selects or reselects the cell on the same frequency as the first cell. In this way, (the probability/degree) that the UE misses the cell (for example, the another cell, the suitable cell, or the cell that can be accessed/camped on) on the same frequency (for example, the same frequency as the first cell) is avoided/reduced, thereby improving the cell access performance of the UE. For example, the cell selection/reselection process can be accelerated. For example, the initial access process can be accelerated. For example, the power consumption of the UE can be reduced. For example, before selecting or reselecting the cell on the same frequency as the first cell, the UE determines that the second condition can be met (for example, it indicates that the UE cannot camp on the cell because the frequency band or frequency-related condition is not met), thereby avoiding a meaningless attempt to access the intra-frequency cell when the second condition is not met.

Correspondingly, in another possible implementation, S302 may be replaced with when the first condition is not met and the second condition corresponding to the second information and/or the third condition are/is met, the UE determines, based on the first indication information, to select or reselect the cell on the same frequency as the first cell, or determines, based on the first indication information, not to select or not to reselect the cell on the same frequency as the first cell. In this way, (the probability/degree) that the UE misses the cell (for example, the another cell, the suitable cell, or the cell that can be accessed/camped on) on the same frequency (for example, the same frequency as the first cell) is avoided/reduced, thereby improving the cell access performance of the UE. For example, the cell selection/reselection process can be accelerated. For example, the initial access process can be accelerated. For example, the power consumption of the UE can be reduced. For example, before selecting or reselecting the cell on the same frequency as the first cell, the UE determines that the second condition can be met (for example, it indicates that the UE cannot camp on the cell because the frequency band or frequency-related condition is not met), thereby avoiding a meaningless attempt to access the intra-frequency cell when the second condition is not met.

Correspondingly, in another possible implementation, S302 may be replaced with when the first condition is not met and the second condition corresponding to the second information and/or the third condition are/is met, the UE determines, based on the second indication information, to select or reselect the cell on the same frequency as the first cell, or determines, based on the second indication information, not to select or not to reselect the cell on the same frequency as the first cell. In this way, (the probability/degree) that the UE misses the cell (for example, the another cell, the suitable cell, or the cell that can be accessed/camped on) on the same frequency (for example, the same frequency as the first cell) is avoided/reduced, thereby improving the cell access performance of the UE. For example, the cell selection/reselection process can be accelerated. For example, the initial access process can be accelerated. For example, the power consumption of the UE can be reduced. For example, before selecting or reselecting the cell on the same frequency as the first cell, the UE determines that the second condition can be met (for example, it indicates that the UE cannot camp on the cell because the frequency band or frequency-related condition is not met), thereby avoiding a meaningless attempt to access the intra-frequency cell when the second condition is not met.

Correspondingly, in another possible implementation, S302 may be replaced with when the first condition is not met and the second condition corresponding to the second information and/or the third condition are/is met, the UE determines, based on the first indication information and the second indication information, to select or reselect the cell on the same frequency as the first cell, or determines, based on the first indication information and the second indication information, not to select or not to reselect the cell on the same frequency as the first cell. In this way, (the probability/degree) that the UE misses the cell (for example, the another cell, the suitable cell, or the cell that can be accessed/camped on) on the same frequency (for example, the same frequency as the first cell) is avoided/reduced, thereby improving the cell access performance of the UE. For example, the cell selection/reselection process can be accelerated. For example, the initial access process can be accelerated. For example, the power consumption of the UE can be reduced. For example, before selecting or reselecting the cell on the same frequency as the first cell, the UE determines that the second condition can be met (for example, it indicates that the UE cannot camp on the cell because the frequency band or frequency-related condition is not met), thereby avoiding a meaningless attempt to access the intra-frequency cell when the second condition is not met.

It should be noted herein that there is no sequence of S301, S303, S304, S305, and S306. This is not limited in this description.

In some embodiments, FIG. 4 is a schematic flowchart of still another cell selection or reselection method according to an embodiment of this description. As shown in FIG. 4, the cell selection or reselection method provided in this embodiment of this description may further include the following steps.

S401: When a first condition is not met or because a first condition is not met, UE determines that N cells, at least N cells, at most N cells, or an $N^{th}$ cell on a first frequency cannot be accessed, where N is a positive integer greater than or equal to 1.

That a cell cannot be accessed may be understood that the cell is barred or considered as barred, or the cell cannot be camped on.

For example, the N cells may be N cells with strongest signal strength on the first frequency.

For example, the $N^{th}$ cell may be understood as a cell that ranks $N^{th}$ on the first frequency, or a cell that ranks $N^{th}$ highest on the first frequency.

For example, the $N^{th}$ cell may be a first cell.

The N cells may be configured by a base station, pre-configured, specified in a protocol, or determined by the UE. This is not limited herein.

"UE determines that N cells, at least N cells, or at most N cells on a first frequency cannot be accessed" or "when a first condition is not met or because a first condition is not met, UE determines that N cells, at least N cells, or at most N cells on a first frequency cannot be accessed" may include/be understood as each cell in the N cells, at least N cells, or at most N cells is barred or considered as barred because the first condition is not met; or some cells in the N cells, at least N cells, or at most N cells (for example, a highest ranked cell is barred) are barred or considered as barred because the first condition is not met.

Optionally, that when a first condition is not met or because a first condition is not met, UE determines that N cells, at least N cells, or at most N cells on a first frequency cannot be accessed may include when a third condition is met and because the first condition is not met, the UE determines, that the N cells, the at least N cells, the at most N cells, or the $N^{th}$ cell on the first frequency cannot be accessed.

S402: The UE determines/considers the first frequency as a frequency with a low priority or a frequency with a lowest priority, the UE does not select or reselect a cell on the same frequency as the first cell, or the UE does not select or reselect a cell on the first frequency.

For related explanations about "the UE does not select or reselect a cell on the first frequency", refer to "the UE does not select or reselect a cell on the same frequency as the first cell", and "a cell on the same frequency as the first cell" is replaced with "a cell on the first frequency". Details are not described herein again.

Optionally, S402 may include any one or more of the UE determines/considers the first frequency as the (frequency) with the low priority or lowest priority within fourth duration; the UE determines/considers the first frequency as the (frequency) with the low priority or lowest priority within a maximum of fourth duration; the UE does not select or reselect the cell on the same frequency as the first cell within fourth duration; or the UE does not select or reselect the cell on the same frequency as the first cell within a maximum of fourth duration.

The fourth duration may be configured by a network device, pre-configured, defined in the protocol, or set by the UE before delivery. This is not limited in this description. For example, the fourth duration may be 300 seconds.

For example, after the UE determines that the N cells, at least N cells, or at most N cells on the first frequency cannot be accessed, the UE may consider the first frequency as the frequency with the lowest priority within 300 seconds, or the UE does not select or reselect the cell on the first frequency within 300 seconds.

For example, the highest ranked cell or a best cell cannot camp on/cannot intervene/is not a candidate cell for reselection because the first condition is not met, and the UE considers a cell that ranks second on the same frequency for cell reselection. However, because the first condition is not met, the cell that ranks second on the frequency is also not suitable for access. In this case, the UE may consider the frequency as the frequency with the lowest priority within a maximum of 300 seconds, or the UE may exclude the cell with the same frequency as the first cell (or a barred cell) as a candidate cell for cell selection/reselection within 300 seconds.

In this embodiment of this description, a quantity of cells that the UE attempts to access is limited, so that the UE can be prevented from continuously attempting to access on the first frequency, thereby improving cell access efficiency and performance of the UE.

It should be noted that S401 and S402 may be used as separate embodiments, and do not depend on S301 to S306, or may be combined with any one or more of S301 to S306. It should be noted that the embodiments shown in FIG. 3A and FIG. 3B may be used as separate embodiments, or may be used as an entire embodiment.

All the solutions in embodiments of this description may be combined on a premise that there is no conflict.

FIG. 5 is a schematic diagram of a structure of still another terminal device 500 according to an embodiment of this application. As shown in FIG. 5, the terminal device 500 may include a first obtaining unit 501, configured to obtain first information corresponding to a first cell, where the first information is not specific to a frequency band or a frequency; and a processing unit 502, configured to select or reselect a cell on the same frequency as the first cell when a first condition corresponding to the first information is not met, where the first condition is used to determine whether the terminal device can access the first cell.

In some embodiments, the first information indicates any one or more of information about an initial downlink BWP, information about an initial uplink BWP, and a carrier bandwidth.

In some embodiments, the first condition includes any one or more of a channel bandwidth supported by the terminal device is wider than or equal to a bandwidth of the initial downlink BWP, and is smaller than or equal to the carrier bandwidth; and the channel bandwidth supported by the terminal device is wider than or equal to a bandwidth of the initial uplink BWP, and is smaller than or equal to the carrier bandwidth.

In some embodiments, the terminal device 500 further includes a second obtaining unit 503, configured to obtain first indication information and/or second indication information, where the first indication information indicates that the terminal device is allowed to select or reselect the cell on the same frequency as the first cell when the first cell is barred or is considered as barred by the terminal device; and the second indication information indicates that the terminal device is allowed to select or reselect the cell on the same frequency as the first cell when the first cell is barred because the first condition is not met, or indicates that first information corresponding to the cell on the same frequency as the first cell is different from the first information corresponding to the first cell.

The processing unit 502 is further configured to determine, based on the first indication information and/or the second indication information, to select or reselect the cell on the same frequency as the first cell.

In some embodiments, the first indication information indicates that the terminal device is disallowed to select or reselect the cell on the same frequency as the first cell when the first cell is barred or is considered as barred by the terminal device; and the second indication information indicates that the terminal device is disallowed to select or reselect the cell on the same frequency as the first cell when the first cell is barred because the first condition is not met, or indicates that the first information corresponding to the cell on the same frequency as the first cell is the same as the first information corresponding to the first cell.

The processing unit 502 is configured to when the first condition is not met, determine, based on the first indication information and/or the second indication information, not to select or not to reselect the cell on the same frequency as the first cell.

In some embodiments, the terminal device 500 further includes a third obtaining unit 504, configured to obtain second information corresponding to the first cell, where the second information is not specific to the frequency band or the frequency; and that a first condition corresponding to the first information is not met further includes the first condition is not met and a second condition corresponding to the second information is met, where the second condition is used to determine whether the terminal device can access the first cell.

In some embodiments, the second condition includes any one or more of the following the terminal device supports a frequency band corresponding to the first cell; the terminal device supports a transmission requirement of the frequency band corresponding to the first cell; and a network device indicates to disable NR uplink transmission with a 7.5 k frequency shift to an LTE raster, or a network device indicates to enable NR uplink transmission with a 7.5 k frequency shift to an LTE raster and the terminal device supports the 7.5 kHz frequency shift.

In some embodiments, the terminal device 500 further includes a determining unit 505, configured to when the first condition is not met, determine that N cells, at least N cells, at most N cells, or an N$^{th}$ cell on a frequency of the first cell cannot be accessed, where N is a positive integer greater than or equal to 1.

The processing unit 502 is configured to determine that the frequency of the first cell has a lowest priority, and/or not to select or not to reselect the cell on the same frequency as the first cell.

In some embodiments, the processing unit 502 is configured to allow selection or reselection of the cell on the same frequency as the first cell.

In some embodiments, the processing unit 502 is configured to disallow selection or reselection of the cell on the same frequency as the first cell.

In some embodiments, the first cell operates in an unlicensed spectrum and/or a licensed spectrum.

Optionally, the terminal device 500 may be implemented by using code, or may be implemented by using a circuit. A communication apparatus may be complete terminal device. For example, each of the first obtaining unit 501, the second obtaining unit 503, and the third obtaining unit 504 may be a receiving circuit, or may be implemented by using an antenna (for example, the transceiver 303 shown in FIG. 2). The determining unit 505 may be a processor (for example, the processor 301 shown in FIG. 2).

An embodiment of this description provides a network device. The network device is configured to send first indication information and/or second indication information to a terminal device; and when a first condition corresponding to first information is not met, indicate the terminal device to determine, based on the first indication information and/or the second indication information, to select or reselect a cell on a same frequency as a first cell. The first information is not specific to a frequency band or a frequency, and the first condition is used to determine whether the terminal device can access the first cell.

The first indication information indicates that the terminal device is allowed to select or reselect the cell on the same frequency as the first cell when the first cell is barred or is considered as barred by the terminal device.

The second indication information indicates that the terminal device is allowed to select or reselect the cell on the same frequency as the first cell when the first cell is barred because the first condition is not met, or indicates that first information corresponding to the cell on the same frequency as the first cell is different from the first information corresponding to the first cell.

In some embodiments, the first indication information indicates that the terminal device is disallowed to select or reselect the cell on the same frequency as the first cell when the first cell is barred or is considered as barred by the terminal device; and the second indication information indicates that the terminal device is disallowed to select or reselect the cell on the same frequency as the first cell when the first cell is barred because the first condition is not met, or indicates that the first information corresponding to the cell on the same frequency as the first cell is the same as the first information corresponding to the first cell.

The network device is further configured to when the first condition corresponding to the first information is not met, indicate the terminal device to determine, based on the first indication information and/or the second indication information, not to select or not to reselect the cell on the same frequency as the first cell.

Optionally, in this description, the terminal device or the network device may be divided into functional units based on the foregoing method examples. For example, each functional unit may be obtained through division based on each corresponding function, or two or more functions may be integrated into one processing unit. The integrated unit may be implemented in a form of hardware, or may be implemented in a form of a software functional unit. It should be noted that, in this description, division into the units is an example, is merely logical function division, and may be other division in actual implementation.

Figure 6:
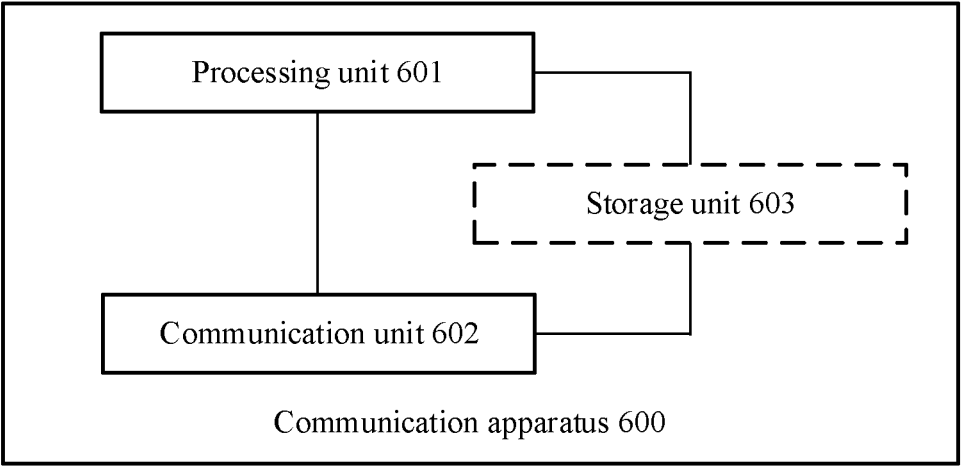
FIG. 6 is a schematic diagram of a structure of a communication apparatus according to an embodiment.

When the integrated unit is used, FIG. 6 is a possible schematic diagram of a structure of a terminal device or a network device (denoted as a communication apparatus 600) in the foregoing embodiments. The communication apparatus 600 includes a processing unit 601 and a communication unit 602, and may further include a storage unit 603. The schematic diagram of the structure shown in FIG. 6 may be used to show structures of the network device or the terminal device in the foregoing embodiments.

When the schematic diagram of the structure shown in FIG. 6 is used to show a structure of the terminal device in the foregoing embodiments, the processing unit 601 is configured to control and manage an action of the terminal device, for example, control the terminal device to perform S301, S302, and S306 in FIG. 3A and FIG. 3B, S401 and S402 in FIG. 4, and/or actions performed by the terminal device in another process described in this disclosure. The processing unit 601 may communicate with another network entity through the communication unit 602, for example, communicate with the network device shown in FIG. 1. The storage unit 603 is configured to store program code and data of the terminal device.

When the schematic diagram of the structure shown in FIG. 6 is used to show the structure of the terminal device in the foregoing embodiments, the communication apparatus 600 may be a terminal device, or may be a chip in a terminal device.

When the schematic diagram of the structure shown in FIG. 6 is used to show a structure of the network device in the foregoing embodiments, the processing unit 601 is configured to control and manage an action of the network device, for example, control the network device to perform S303, S304, and S305 in FIG. 3A and FIG. 3B, and/or actions performed by the network device in another process described in embodiments of this description. The processing unit 601 may communicate with another network entity through the communication unit 602, for example, communicate with the terminal device shown in FIG. 1. The storage unit 603 is configured to store program code and data of the network device.

When the schematic diagram of the structure shown in FIG. 6 is used to show the structure of the network device in the foregoing embodiments, the communication apparatus 600 may be a network device, or may be a chip in a network device.

When the communication apparatus 600 is a network device or a terminal device, the processing unit 601 may be a processor or a controller, and the communication unit 602 may be a communication interface, a transceiver, a transceiver circuit, a transceiver apparatus, or the like. The communication interface is a general term, and may include one or more interfaces. The storage unit 603 may be a memory. When the communication apparatus 600 is a chip in a terminal device or a network device, the processing unit 601 may be a processor or a controller, and the communication unit 602 may be an input interface and/or an output interface, a pin, a circuit, or the like. The storage unit 603 may be a storage unit (for example, a register or a cache) in the chip, or may be a storage unit (for example, a ROM) or a RAM that is in the terminal device or the network device and that is located outside the chip.

The communication unit may also be referred to as a transceiver unit. An antenna and a control circuit that have a sending and receiving function in the communication apparatus 600 may be considered as the communication unit 602 in the communication apparatus 600, and a processor that has a processing function may be considered as the processing unit 601 in the communication apparatus 600. Optionally, a component configured to implement a receiving function in the communication unit 602 may be considered as a receiving unit. The receiving unit is configured to perform a receiving step. The receiving unit may be a receiver machine, a receiver, a receiving circuit, or the like.

In an implementation process, the steps in the methods provided in the embodiments may be completed by using a hardware integrated logic circuit in the processor, or by using instructions in a form of software. The steps of the methods disclosed with reference to this description may be directly implemented by a hardware processor, or may be implemented by a combination of hardware and a software module in a processor.

The processor may include but is not limited to at least one of a CPU, a microprocessor, a digital signal processor (DSP), a microcontroller unit (MCU), or a computing device used for running software such as an artificial intelligence processor. Each computing device may include one or more cores used to execute software instructions to perform operations or processing. The processor may be an independent semiconductor chip, or may be integrated with another circuit into a semiconductor chip. For example, the processor may form a system-on-a-chip (SoC) with another circuit (such as a codec circuit, a hardware acceleration circuit, or various buses and interface circuits). Alternatively, the processor may be integrated into an ASIC as a built-in processor of the ASIC, and the ASIC integrated with the processor may be separately packaged, or may be packaged with another circuit. In addition to the core configured to execute software instructions to perform the operation or processing, the processor may further include a necessary hardware accelerator, for example, a field-programmable gate array (FPGA), a programmable logic device (PLD), or a logic circuit that implements a dedicated logic operation.

The memory may include at least one of a ROM or another type of static storage device that can store static information and instructions, a RAM or another type of dynamic storage device that can store information and instructions, or an EEPROM. In some scenarios, the memory may alternatively be a CD-ROM or another compact disc storage, an optical disc storage (including a compact optical disc, a laser disc, an optical disc, a digital versatile disc, a BLU-RAY disc, or the like), a magnetic disk storage medium or another magnetic storage device, or any other medium that can be used to carry or store expected program code in a form of an instruction or a data structure and that can be accessed by a computer. However, the memory is not limited thereto.

This description further provides a computer-readable storage medium. The computer-readable storage medium stores instructions. When the instructions are run on a computer, the computer is enabled to perform the method in any one of the foregoing embodiments.

This description further provides a computer program product. When the computer program product runs on a computer, the computer is enabled to perform the method in any one of the foregoing embodiments.

This description further provides a communication apparatus. The apparatus may exist in a product form of a chip. The structure of the apparatus includes a processor and an interface circuit. The processor is configured to communicate with another apparatus by using a receiving circuit, so that the apparatus performs the method in any one of the foregoing embodiments.

This description further provides a communication system, including a network device and the foregoing terminal device.

This description further provides a chip. The chip includes a processor and an interface circuit. The interface circuit is coupled to the processor. The processor is configured to run a computer program or instructions to implement the foregoing method. The interface circuit is configured to communicate with another module other than the chip.

The foregoing descriptions about implementations allow a person skilled in the art to understand that, for the purpose of convenient and brief description, division into the foregoing functional modules is used as an example for illustration. In actual application, the foregoing functions may be allocated to different functional modules and implemented based on a requirement, in other words, an inner structure of an apparatus is divided into different functional modules to implement all or some of the functions described above.

In the several embodiments provided, it should be understood that the disclosed apparatus and method may be implemented in other manners. For example, the described apparatus embodiment is merely an example. For example, division into the modules or the units is merely logical function division and may be other division in actual implementation. For example, a plurality of units or components may be combined or integrated into another apparatus, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may be one or more physical units, may be located in one place, or may be distributed on different places. Some or all of the units may be selected based on actual requirements to achieve the objectives of the solutions of embodiments.

In addition, functional units in embodiments of this description may be integrated into one processing unit, each of the units may exist alone physically, or two or more units are integrated into one unit. The integrated unit may be implemented in a form of hardware, or may be implemented in a form of a software functional unit.

When the integrated unit is implemented in the form of the software functional unit and sold or used as an independent product, the integrated unit may be stored in a readable storage medium. Based on such an understanding, the technical solutions in embodiments of this description essentially, or the part contributing to the conventional technology, or all or some of the technical solutions may be implemented in a form of a software product. The software product is stored in a storage medium and includes several instructions for instructing a device (which may be a single-chip microcomputer, a chip or the like) or a processor (processor) to perform all or some of the steps of the methods described in embodiments of this description. The foregoing storage medium includes any medium that can store program code, such as a USB flash drive, a removable hard disk, a ROM, a RAM, a magnetic disk, or an optical disc.

Although this disclosure is described with reference to specific features and embodiments thereof, it is clear that various modifications and combinations may be made to them without departing from the scope of this disclosure. Correspondingly, the specification and the accompanying drawings are merely example descriptions of this disclosure defined in the appended claims, and are considered as any of or all modifications, variations, combinations or equivalents that cover the scope of this disclosure. It is clearly that a person skilled in the art can make various modifications and variations to this description without departing from the scope of this disclosure. In this way, this disclosure is intended to cover these modifications and variations of this description provided that they fall within the scope of protection defined in the following claims and their equivalent technologies.

The foregoing descriptions are merely specific implementations of this disclosure, but are not intended to limit the protection scope of this disclosure. Any variation or replacement within the technical scope disclosed in this disclosure shall fall within the protection scope of this disclosure. Therefore, the protection scope of this disclosure shall be subject to the protection scope of the claims.

The invention claimed is:

1. A method implemented by a terminal device, wherein the method comprises:

obtaining first information corresponding to a first cell, wherein the first information is not specific to a frequency band or a frequency; and selecting or reselecting, when a first condition corresponding to the first information is not met, a cell on a same frequency as the first cell, wherein the first condition determines whether the terminal device can access the first cell, and wherein the first condition comprises at least one of:

a channel bandwidth is supported by the terminal device, is wider than or equal to a bandwidth of the initial downlink bandwidth part (BWP), and is smaller than or equal to the carrier bandwidth; or the channel bandwidth is supported by the terminal device, is wider than or equal to a bandwidth of the initial uplink BWP, and is smaller than or equal to the carrier bandwidth.

2. The method according to claim 1, wherein the first information indicates at least one of information about an initial downlink bandwidth part (BWP), information about an initial uplink BWP, or a carrier bandwidth.

3. The method according to claim 1, further comprising:

obtaining first indication information or second indication information, wherein the first indication information indicates that the terminal device is allowed to select or reselect the cell on the same frequency as the first cell when the first cell is barred or is considered as barred by the terminal device, and wherein the second indication information indicates that the terminal device is allowed to select or reselect the cell on the same frequency as the first cell when the first cell is barred because the first condition is not met, or the second indication information indicates that first information corresponding to the cell on the same frequency as the first cell is different from the first information corresponding to the first cell; and determining, based on the first indication information or the second indication information, to select or reselect the cell on the same frequency as the first cell.

4. The method according to claim 1, further comprising:

obtaining first indication information or second indication information, wherein the first indication information indicates that the terminal device is disallowed to select or reselect the cell on the same frequency as the first cell when the first cell is barred or is considered as barred by the terminal device, and wherein the second indication information indicates that the terminal device is disallowed to select or reselect the cell on the same frequency as the first cell when the first cell is barred because the first condition is not met, or the second indication information indicates that the first information corresponding to the cell on the same frequency as the first cell is the same as the first information corresponding to the first cell; and determining, when the first condition is not met and based on the first indication information or the second indication information, not to select or not to reselect the cell on the same frequency as the first cell.

5. The method according to claim 1, further comprising obtaining second information corresponding to the first cell, wherein the second information is specific to a first frequency band or a first frequency, wherein, when the first condition is not met, a second condition corresponding to the second information is met, and wherein the second condition determines whether the terminal device can access the first cell.

6. The method according to claim 5, wherein the second condition comprises at least one of:

the terminal device supports the first frequency band that corresponds to the first cell;

the terminal device supports a transmission requirement of the first frequency band corresponding to the first cell; or a network device indicates to disable a new radio (NR) uplink transmission with a 7.5 kilohertz (kHz) frequency shift to a Long-Term Evolution (LTE) raster, or the network device indicates to enable the NR uplink transmission with the 7.5 kHz frequency shift to the LTE raster and the terminal device supports the 7.5 kHz frequency shift.

7. The method according to claim 1, further comprising:

determining, when the first condition is not met, that N cells, at least N cells, at most N cells, or an N$^{th}$ cell on a first frequency of the first cell cannot be accessed, wherein N is a positive integer greater than or equal to 1; and determining that the first frequency of the first cell has a lowest priority.

8. The method according to claim 1, wherein selecting or reselecting the cell on the same frequency as the first cell comprises allowing the terminal device to select or reselect the cell on the same frequency as the first cell.

9. The method according to claim 1, wherein skipping selecting or reselecting the cell on the same frequency as the first cell comprises disallowing the terminal device to select or reselect the cell on the same frequency as the first cell.

10. The method according to claim 1, wherein the method further comprises operating in an unlicensed spectrum.

11. A method implemented by a network device, wherein the method comprises sending, by a network device to a terminal device when a first condition corresponding to first information is not met, first indication information or second indication information to instruct selecting or reselecting, based on the first indication information or the second indication information, a cell on a same frequency as a first cell, wherein the first condition is to determine whether the terminal device can access the first cell;

wherein the first information is not specific to a frequency band or a frequency, wherein the first indication information indicates that the terminal device is allowed to select or reselect the cell on the same frequency as the first cell when the first cell is barred or is considered as barred by the terminal device; and wherein the second indication information indicates that the terminal device is allowed to select or reselect the cell on the same frequency as the first cell when the first cell is barred because the first condition is not met, or the second indication information indicates that first information corresponding to the cell on the same frequency as the first cell is different from the first information corresponding to the first cell.

12. The method according to claim 11, further comprising:

obtaining first indication information or second indication information, wherein the first indication information indicates that the terminal device is disallowed to select or reselect the cell on the same frequency as the first cell when the first cell is barred or is considered as barred by the terminal device, and wherein the second indication information indicates that the terminal device is disallowed to select or reselect the cell on the same frequency as the first cell when the first cell is barred because the first condition is not met, or the second indication information indicates that the first information corresponding to the cell on the same frequency as the first cell is the same as the first information corresponding to the first cell; and indicating, when the first condition corresponding to the first information is not met, to determine, based on the first indication information or the second indication information, not to select or not to reselect the cell on the same frequency as the first cell.

13. A terminal device, comprising:

a memory configured to store instructions; and one or more processors coupled to the memory, wherein when executed by the one or more processors, the instructions cause the communication device to:

obtain first information corresponding to a first cell, wherein the first information is not specific to a frequency band or a frequency; and select or reselect, when a first condition corresponding to the first information is not met, a cell on a same frequency as the first cell, wherein the first condition determines whether the terminal device can access the first cell, and wherein the first condition comprises at least one of:

a channel bandwidth is supported by the terminal device, is wider than or equal to a bandwidth of the initial downlink bandwidth part (BWP), and is smaller than or equal to the carrier bandwidth; or the channel bandwidth is supported by the terminal device, is wider than or equal to a bandwidth of the initial uplink BWP, and is smaller than or equal to the carrier bandwidth.

14. The terminal device according to claim 13, wherein the first information indicates at least one of information about an initial downlink bandwidth part (BWP), information about an initial uplink BWP, or a carrier bandwidth.

15. The terminal device according to claim 13, wherein the one or more processors are further configured to execute the instructions to cause the terminal device to:

obtain first indication information or second indication information, wherein the first indication information indicates that the terminal device is allowed to select or reselect the cell on the same frequency as the first cell when the first cell is barred or is considered as barred by the terminal device, and wherein the second indication information indicates that the terminal device is allowed to select or reselect the cell on the same frequency as the first cell when the first cell is barred because the first condition is not met, or the second indication information indicates that first information corresponding to the cell on the same frequency as the first cell is different from the first information corresponding to the first cell; and determine, based on the first indication information or the second indication information, to select or reselect the cell on the same frequency as the first cell.

16. The terminal device according to claim 13, wherein the one or more processors are further configured to execute the instructions to cause the terminal device to:

obtain first indication information or second indication information, wherein the first indication information indicates that the terminal device is disallowed to select or reselect the cell on the same frequency as the first cell when the first cell is barred or is considered as barred by the terminal device, and the second indication information indicates that the terminal device is disallowed to select or reselect the cell on the same frequency as the first cell when the first cell is barred because the first condition is not met, or the second indication information indicates that the first information corresponding to the cell on the same frequency as the first cell is the same as the first information corresponding to the first cell; and determine, when the first condition is not met and based on the first indication information or the second indication information, not to select or not to reselect the cell on the same frequency as the first cell.

17. The terminal device according to claim 13, wherein the one or more processors are further configured to execute the instructions to cause the terminal device to obtain second information corresponding to the first cell, wherein the second information is specific to a first frequency band or a first frequency, wherein, when the first condition is not met, a second condition corresponding to the second information is met, and wherein the second condition determine whether the terminal device can access the first cell.

18. The terminal device according to claim 17, wherein the second condition comprises a network device indicates to disable a new radio (NR) uplink transmission with a 7.5 kilohertz (kHz) frequency shift to a Long-Term Evolution (LTE) raster.

19. The terminal device according to claim 17, wherein the second condition comprises a network device indicates to enable a new radio (NR) uplink transmission with a 7.5 kilohertz (kHz) frequency shift to a Long-Term Evolution (LTE) raster and the terminal device supports the 7.5 kHz frequency shift.

20. The terminal device according to claim 17, wherein the second condition comprises the terminal device supports the first frequency band that corresponds to the first cell.

* * * * *